United States Patent
Smith et al.

(10) Patent No.: US 9,440,689 B1
(45) Date of Patent: Sep. 13, 2016

(54) AERODYNAMIC STRUCTURES SECURED TO THE UNDERBODY OF CARGO BODIES

(71) Applicant: STEMCO LP, Charlotte, NC (US)

(72) Inventors: Andrew F. Smith, Redwood City, CA (US); Jared A. Niemiec, Belmont, CA (US); Court S. Hinricher, San Francisco, CA (US); Michael W. Polidori, Hayward, CA (US); Jeffrey J. Grossmann, San Francisco, CA (US)

(73) Assignee: STEMCO LP, Charlotte, NC (US)

( * ) Notice: Subject to any disclaimer, the term of this patent is extended or adjusted under 35 U.S.C. 154(b) by 0 days.

(21) Appl. No.: 14/455,620

(22) Filed: Aug. 8, 2014

Related U.S. Application Data

(62) Division of application No. 13/623,858, filed on Sep. 20, 2012, now abandoned.

(60) Provisional application No. 61/544,783, filed on Oct. 7, 2011, provisional application No. 61/626,112, filed on Sep. 20, 2011.

(51) Int. Cl.
*B62D 35/02* (2006.01)
*B62D 35/00* (2006.01)

(52) U.S. Cl.
CPC .............. *B62D 35/02* (2013.01); *B62D 35/001* (2013.01)

(58) Field of Classification Search
CPC .............................. B62D 35/02; B62D 35/001
USPC .......... 296/180.1, 180.4, 180.5, 181.5, 184.1
See application file for complete search history.

(56) References Cited

U.S. PATENT DOCUMENTS

| | | | |
|---|---|---|---|
| 227,401 | A | 11/1880 | Chaeles et al. |
| 609,789 | A | 8/1898 | George |

(Continued)

FOREIGN PATENT DOCUMENTS

| | | |
|---|---|---|
| CA | 2315339 A1 | 2/2001 |
| DE | 2911084 A1 | 9/1980 |

(Continued)

OTHER PUBLICATIONS

Notification of Transmittal of the International Search Report and the Written Opinion of the International Searching Authority, or the Declaration relating to PCT Application No. PCT/US06/24642 (Jul. 27, 2007).

(Continued)

*Primary Examiner* — Jason S Morrow
*Assistant Examiner* — E Turner Hicks
(74) *Attorney, Agent, or Firm* — Perkins Coie LLP

(57) ABSTRACT

An aerodynamic underbody fairing or "skirt" that is attached to the rear wheels or "bogeys" of a truck cargo body which typically can be slidably adjusted forward and aft along the cargo body. The various embodiments allow for a skirt that attaches to the bogeys of a truck cargo body and extends rearward to the rear plane of the trailer, and is of a retractable nature to allow for slidable adjustment of bogeys forward and aft along the cargo body for the purpose of continuing streamlined flow along the side of a truck cargo body already equipped with a side skirt forward of the bogeys. In the various embodiments of the invention, the retractable nature of the invention allows for a continuous skirt surface in-plane with the side of the truck cargo body extending from the bogeys to the rear plane of the truck cargo body, regardless of bogey position.

22 Claims, 18 Drawing Sheets

(56) References Cited

U.S. PATENT DOCUMENTS

| | | |
|---|---|---|
| 797,077 A | 8/1905 | Shaw |
| 891,537 A | 6/1908 | Graff |
| 1,352,679 A | 9/1920 | Myers |
| 1,364,053 A | 12/1920 | Quintin |
| 1,390,793 A | 9/1921 | Kyle et al. |
| 1,517,365 A | 12/1924 | Kleine |
| 1,543,877 A | 6/1925 | Saunders |
| 1,584,275 A | 5/1926 | Chalkley |
| 1,714,609 A | 5/1929 | Massey |
| 1,871,390 A | 8/1932 | Reynolds |
| 1,871,396 A | 8/1932 | Stalker |
| 1,875,276 A | 8/1932 | Steigert |
| 1,879,594 A | 9/1932 | Trey |
| 1,912,138 A | 5/1933 | Hoover |
| 1,913,169 A | 6/1933 | Martin |
| 2,037,942 A | 4/1936 | Stalker |
| 2,199,883 A | 5/1940 | Ishiwata |
| 2,208,075 A | 7/1940 | Jabelmann |
| 2,237,141 A | 4/1941 | Gale et al. |
| 2,338,533 A | 1/1944 | Pash et al. |
| 2,344,515 A | 3/1944 | Massey |
| 2,547,528 A | 4/1951 | Lewis |
| 2,569,354 A | 9/1951 | Tracy et al. |
| 2,569,983 A | 10/1951 | Favre |
| 2,737,411 A | 3/1956 | Potter |
| 2,772,624 A | 12/1956 | Carnes |
| 2,780,980 A | 2/1957 | Kennedy |
| 2,887,243 A | 5/1959 | Forrest, Sr. |
| 2,933,344 A | 4/1960 | Shumaker |
| 2,938,680 A | 5/1960 | Greene et al. |
| 2,964,352 A | 12/1960 | Werner |
| 3,010,754 A | 11/1961 | Shumaker |
| 3,016,700 A | 1/1962 | Howald |
| 3,053,351 A | 9/1962 | Fulcher et al. |
| 3,074,079 A | 1/1963 | Isaacson et al. |
| 3,112,135 A | 11/1963 | Conrad et al. |
| 3,178,131 A | 4/1965 | Laing |
| 3,214,215 A | 10/1965 | Hansen |
| 3,276,811 A | 10/1966 | Schmidt |
| 3,342,523 A | 9/1967 | Lutgen |
| 3,346,186 A | 10/1967 | Fulton et al. |
| 3,415,566 A | 12/1968 | Kerrigan |
| 3,425,740 A | 2/1969 | De Vaughn |
| 3,455,594 A | 7/1969 | Hall et al. |
| 3,496,687 A | 2/1970 | Greenberg et al. |
| 3,526,365 A | 9/1970 | Ursery et al. |
| 3,711,146 A | 1/1973 | Madzsar et al. |
| 3,743,343 A | 7/1973 | Grote, Sr. et al. |
| 3,791,468 A | 2/1974 | Bryan, Jr. |
| 3,807,787 A | 4/1974 | Gotz |
| 3,834,752 A | 9/1974 | Cook et al. |
| 3,934,922 A | 1/1976 | MacCready, Jr. et al. |
| 3,941,334 A | 3/1976 | Cole |
| 3,951,445 A | 4/1976 | Tatom |
| 3,960,402 A | 6/1976 | Keck |
| 3,971,586 A | 7/1976 | Saunders |
| 3,977,716 A | 8/1976 | Whited |
| 3,994,451 A | 11/1976 | Cole |
| 3,994,452 A | 11/1976 | Cole et al. |
| 3,999,797 A | 12/1976 | Kirsch et al. |
| 4,006,932 A | 2/1977 | McDonald et al. |
| 4,021,069 A | 5/1977 | Hersh |
| 4,035,013 A | 7/1977 | Abbott, III |
| 4,053,124 A | 10/1977 | Cole et al. |
| 4,113,299 A | 9/1978 | Johnson et al. |
| 4,117,900 A | 10/1978 | Amick et al. |
| 4,126,974 A | 11/1978 | Hardin et al. |
| 4,142,755 A | 3/1979 | Keedy et al. |
| 4,154,149 A | 5/1979 | Holford et al. |
| 4,174,863 A | 11/1979 | Gotz |
| 4,210,354 A | 7/1980 | Canning et al. |
| 4,214,787 A | 7/1980 | Chain |
| 4,236,745 A | 12/1980 | Davis |
| 4,248,103 A | 2/1981 | Halsall et al. |
| 4,257,641 A | 3/1981 | Keedy |
| 4,269,444 A | 5/1981 | Emory |
| 4,316,630 A | 2/1982 | Evans |
| 4,320,920 A | 3/1982 | Goudey |
| 4,349,155 A | 9/1982 | Donguy |
| 4,357,045 A | 11/1982 | Kinford, Jr. |
| 4,375,898 A | 3/1983 | Stephens |
| 4,379,582 A | 4/1983 | Miwa |
| 4,383,407 A | 5/1983 | Inman et al. |
| 4,384,630 A | 5/1983 | Steiner |
| 4,386,801 A | 6/1983 | Chapman et al. |
| 4,421,354 A | 12/1983 | Lemaster |
| 4,433,865 A | 2/1984 | Crompton et al. |
| RE31,565 E | 4/1984 | Beaulieu |
| 4,451,074 A | 5/1984 | Scanlon et al. |
| D274,322 S | 6/1984 | Hayes et al. |
| 4,457,550 A | 7/1984 | Gielow et al. |
| 4,458,936 A | 7/1984 | Mulholland et al. |
| 4,458,937 A | 7/1984 | Beckmann et al. |
| 4,462,628 A | 7/1984 | Gregg |
| 4,486,046 A | 12/1984 | Whitney et al. |
| 4,489,889 A | 12/1984 | Inman et al. |
| 4,508,380 A | 4/1985 | Sankrithi et al. |
| 4,518,188 A | 5/1985 | Witten |
| 4,525,123 A | 6/1985 | Curci et al. |
| 4,601,508 A | 7/1986 | Kerian |
| 4,611,847 A | 9/1986 | Sullivan |
| 4,640,541 A | 2/1987 | FitzGerald et al. |
| 4,653,788 A | 3/1987 | Di Giusto |
| 4,678,118 A | 7/1987 | Fukami et al. |
| 4,682,808 A | 7/1987 | Bilanin et al. |
| 4,688,841 A | 8/1987 | Moore et al. |
| 4,702,509 A | 10/1987 | Elliott, Sr. et al. |
| 4,706,910 A | 11/1987 | Walsh et al. |
| 4,722,500 A | 2/1988 | Bray |
| 4,741,569 A | 5/1988 | Sutphen et al. |
| 4,746,160 A | 5/1988 | Wiesemeyer |
| 4,773,692 A | 9/1988 | Schleicher et al. |
| 4,784,429 A | 11/1988 | Hodges et al. |
| 4,810,022 A | 3/1989 | Takagi et al. |
| 4,818,015 A | 4/1989 | Scanlon et al. |
| 4,944,550 A | 7/1990 | Drown et al. |
| 4,951,994 A | 8/1990 | Miwa |
| 4,976,349 A | 12/1990 | Adkins |
| 4,978,162 A | 12/1990 | Labbe |
| 5,000,508 A | 3/1991 | Woods |
| 5,058,945 A | 10/1991 | Elliott et al. |
| 5,108,145 A | 4/1992 | Harris |
| 5,156,195 A | 10/1992 | Wehler et al. |
| 5,190,342 A | 3/1993 | Marlowe et al. |
| 5,199,762 A | 4/1993 | Scheele et al. |
| 5,236,347 A | 8/1993 | Andrus et al. |
| 5,237,887 A | 8/1993 | Appleberry et al. |
| 5,240,306 A | 8/1993 | Flemming et al. |
| 5,280,990 A | 1/1994 | Rinard |
| 5,317,880 A | 6/1994 | Spears |
| 5,332,280 A | 7/1994 | DuPont et al. |
| 5,348,366 A | 9/1994 | Baker et al. |
| 5,375,903 A | 12/1994 | Lechner et al. |
| 5,498,059 A | 3/1996 | Switlik |
| 5,570,924 A | 11/1996 | Few et al. |
| 5,609,384 A | 3/1997 | Loewen et al. |
| 5,823,610 A | 10/1998 | Ryan et al. |
| 5,842,734 A | 12/1998 | Lechner et al. |
| 5,857,648 A | 1/1999 | Dailey et al. |
| 5,908,217 A | 6/1999 | Englar |
| 5,947,548 A | 9/1999 | Carper et al. |
| 6,045,095 A | 4/2000 | Parrish, IV |
| 6,092,861 A | 7/2000 | Whelan |
| 6,170,904 B1 | 1/2001 | Schaedlich et al. |
| 6,205,772 B1 | 3/2001 | Perrier et al. |
| 6,257,654 B1 | 7/2001 | Boivin et al. |
| 6,286,892 B1 | 9/2001 | Bauer et al. |
| 6,286,894 B1 | 9/2001 | Kingham et al. |
| 6,309,010 B1 | 10/2001 | Whitten |
| 6,375,126 B1 | 4/2002 | Sakurai et al. |
| 6,382,708 B1 | 5/2002 | Erdelitsch et al. |
| 6,409,252 B1 | 6/2002 | Andrus |
| 6,418,710 B1 | 7/2002 | Perrier et al. |
| 6,457,766 B1 | 10/2002 | Telnack et al. |

(56) References Cited

U.S. PATENT DOCUMENTS

| | | |
|---|---|---|
| 6,467,833 B1 | 10/2002 | Travers et al. |
| 6,485,087 B1 | 11/2002 | Roberge et al. |
| 6,561,575 B2 | 5/2003 | Fairburn et al. |
| 6,565,112 B2 | 5/2003 | Hanson et al. |
| 6,595,578 B1 | 7/2003 | Calsoyds et al. |
| 6,616,218 B2 | 9/2003 | Bauer et al. |
| 6,644,720 B2 | 11/2003 | Long et al. |
| 6,666,498 B1 | 12/2003 | Whitten et al. |
| 6,669,270 B1 | 12/2003 | Card et al. |
| 6,742,616 B2 | 6/2004 | Leban et al. |
| 6,779,834 B1 | 8/2004 | Keller et al. |
| 6,789,839 B1 | 9/2004 | Samuelson et al. |
| 6,799,791 B2 | 10/2004 | Reiman et al. |
| 6,846,035 B2 | 1/2005 | Wong et al. |
| 6,854,788 B1 | 2/2005 | Graham |
| 6,877,793 B2 | 4/2005 | Cory et al. |
| 6,886,882 B2 | 5/2005 | Farlow et al. |
| 6,915,611 B2 | 7/2005 | Reiman et al. |
| 6,959,958 B2 | 11/2005 | Basford et al. |
| 6,974,178 B2 | 12/2005 | Ortega et al. |
| 7,008,004 B2 | 3/2006 | Ortega et al. |
| 7,008,005 B1 | 3/2006 | Graham et al. |
| 7,147,270 B1 | 12/2006 | Andrus et al. |
| 7,192,077 B1 | 3/2007 | Hilleman |
| 7,207,620 B2 | 4/2007 | Cosgrove et al. |
| 7,240,958 B2 | 7/2007 | Skopic |
| 7,243,980 B2 | 7/2007 | Vala |
| 7,374,229 B1 | 5/2008 | Noll et al. |
| 7,374,230 B2 | 5/2008 | Breidenbach et al. |
| 7,380,868 B2 | 6/2008 | Breidenbach et al. |
| 7,404,592 B2 | 7/2008 | Reiman et al. |
| 7,484,791 B1 | 2/2009 | Chen |
| 7,549,695 B2 | 6/2009 | Royer et al. |
| 7,578,541 B2 | 8/2009 | Layfield et al. |
| 7,618,086 B2 | 11/2009 | Breidenbach et al. |
| 7,625,034 B1 | 12/2009 | Fitzgerald |
| 7,641,262 B2 | 1/2010 | Nusbaum |
| 7,740,304 B1 | 6/2010 | Breu et al. |
| 7,780,224 B2 | 8/2010 | Roush |
| 7,789,453 B2 | 9/2010 | Roush et al. |
| 7,794,011 B2 | 9/2010 | Kjellgren et al. |
| 7,806,464 B2 | 10/2010 | Cardolle |
| 7,854,468 B2 | 12/2010 | Vogel et al. |
| 7,862,102 B1 | 1/2011 | Benton |
| 7,950,720 B2 | 5/2011 | Skopic |
| 7,992,923 B2 | 8/2011 | Dayton |
| 8,251,436 B2 | 8/2012 | Henderson et al. |
| 8,360,509 B2 | 1/2013 | Grossmann et al. |
| 8,608,228 B2 | 12/2013 | Visentin et al. |
| 9,126,638 B2 | 9/2015 | Breidenbach |
| 9,145,177 B2 | 9/2015 | Smith et al. |
| 9,180,919 B2 | 11/2015 | Breidenbach |
| 2002/0005655 A1 | 1/2002 | Bauer et al. |
| 2002/0021023 A1 | 2/2002 | Leban et al. |
| 2002/0030384 A1 | 3/2002 | Basford et al. |
| 2003/0057736 A1* | 3/2003 | Long ................ B62D 25/168 296/180.4 |
| 2003/0205913 A1 | 11/2003 | Leonard et al. |
| 2004/0118055 A1 | 6/2004 | Reiman et al. |
| 2004/0119319 A1 | 6/2004 | Reiman et al. |
| 2004/0256885 A1 | 12/2004 | Bui |
| 2005/0040637 A1* | 2/2005 | Wood ................ B62D 25/168 280/768 |
| 2005/0146161 A1 | 7/2005 | Uland |
| 2005/0159075 A1 | 7/2005 | Isobe et al. |
| 2005/0204681 A1 | 9/2005 | Zeigler et al. |
| 2006/0157623 A1 | 7/2006 | Voglsinger et al. |
| 2006/0252361 A1 | 11/2006 | Henderson, II |
| 2006/0273625 A1 | 12/2006 | Andrus et al. |
| 2007/0001481 A1 | 1/2007 | Breidenbach et al. |
| 2007/0120397 A1 | 5/2007 | Layfield et al. |
| 2007/0126261 A1 | 6/2007 | Breidenbach et al. |
| 2007/0200390 A1 | 8/2007 | Lotarev et al. |
| 2007/0228772 A1 | 10/2007 | Froeschle et al. |
| 2007/0246969 A1 | 10/2007 | Smith et al. |
| 2008/0048468 A1 | 2/2008 | Holubar et al. |
| 2008/0061597 A1 | 3/2008 | Reiman et al. |
| 2008/0061598 A1 | 3/2008 | Reiman et al. |
| 2008/0093886 A1 | 4/2008 | Nusbaum et al. |
| 2008/0217957 A1 | 9/2008 | Schoon et al. |
| 2008/0272617 A1 | 11/2008 | Roush et al. |
| 2008/0290686 A1 | 11/2008 | Royer et al. |
| 2008/0303310 A1 | 12/2008 | Breidenbach et al. |
| 2008/0309122 A1 | 12/2008 | Smith et al. |
| 2009/0096250 A1 | 4/2009 | Kohls et al. |
| 2009/0140542 A1 | 6/2009 | Breidenbach et al. |
| 2009/0146453 A1 | 6/2009 | Ortega et al. |
| 2009/0179456 A1 | 7/2009 | Holubar et al. |
| 2009/0200834 A1 | 8/2009 | Vogel et al. |
| 2009/0212594 A1 | 8/2009 | Breidenbach et al. |
| 2009/0212595 A1 | 8/2009 | Heppel et al. |
| 2009/0212596 A1 | 8/2009 | Reiman et al. |
| 2009/0230726 A1 | 9/2009 | Reiman et al. |
| 2009/0236872 A1 | 9/2009 | Wood |
| 2010/0066123 A1 | 3/2010 | Ortega et al. |
| 2010/0164249 A1 | 7/2010 | Nusbaum |
| 2010/0222671 A1 | 9/2010 | Cohen et al. |
| 2011/0068605 A1 | 3/2011 | Domo et al. |
| 2011/0095564 A1 | 4/2011 | Chen |
| 2011/0095565 A1 | 4/2011 | Chen |
| 2011/0095566 A1 | 4/2011 | Chen |
| 2012/0235441 A1* | 9/2012 | Dayton ................ B62D 35/001 296/180.4 |
| 2013/0249241 A1* | 9/2013 | Baker ................ B62D 35/001 296/180.4 |
| 2014/0217775 A1 | 8/2014 | Breidenbach et al. |
| 2014/0319870 A1 | 10/2014 | Breidenbach et al. |
| 2014/0346807 A1 | 11/2014 | Breidenbach |
| 2015/0266520 A1 | 9/2015 | Breidenbach |

FOREIGN PATENT DOCUMENTS

| | | |
|---|---|---|
| DE | 2922130 A1 | 12/1980 |
| DE | 19640965 A1 | 4/1997 |
| DE | 29705882 U1 | 7/1997 |
| DE | 29623407 U1 | 7/1998 |
| DE | 10228658 A1 | 1/2004 |
| DE | 10240504 A1 | 3/2004 |
| DE | 10316105 A1 | 10/2004 |
| EP | 1870321 A1 | 12/2007 |
| FR | 2623155 A1 | 5/1989 |
| JP | 06016157 A | 1/1994 |
| WO | 2007079306 A2 | 7/2007 |
| WO | 2008024386 A2 | 2/2008 |
| WO | 2008124573 A1 | 10/2008 |
| WO | 2008144025 A3 | 1/2009 |
| WO | 2014011886 A1 | 1/2014 |

OTHER PUBLICATIONS

Clarkson University, Kenneth Visser, 2 pages, http://www.clarkson.edu/mae/faculty_pages/visser.html.

International Search Report and Written Opinion of the International Searching Authority of the United States Patent Office for PCT/US12/62237, mailed Jan. 15, 2013. 8 pages.

International Search Report and Written Opinion of the International Searching Authority of the European Patent Office for PCT/US2011/055758, mailed Mar. 2, 2012. 13 pages.

International Search Report and Written Opinion of the International Searching Authority of the European Patent Office for PCT/US2013/050083, mailed Oct. 24, 2013. 9 pages.

International Search Report and Written Opinion of the International Searching Authority of the European Patent Office for PCT/US2008/006374, mailed Nov. 14, 2008. 14 pages.

International Search Report and Written Opinion of the International Searching Authority of the European Patent Office for PCT/US2012/056365, mailed Feb. 27, 2013. 10 pages.

Ken Visser, "Drag Reduction of Tractor Trailers", Clarkson University, Nov. 2005, 4 pages.

McCallen, et al., "Progress in Reducing Aerodynamic Drag for Higher Efficiency of Heavy Duty Trucks (Class 7-8)", Lawrence Livermore National Laboratory, Apr. 1999, 14 pages.

(56) References Cited

OTHER PUBLICATIONS

Ogburn, et al., "Truck Efficiency and GHG Reduction Opportunities in the Canadian Truck Fleet", Rocky Mountain Institute, 13 pages.

Ortega, et al., "An Experimental Study of Drag Reduction Devices for a Trailer Underbody and Base", Lawrence Livermore National Laboratory, Jun. 4, 2004, 17 pages.

Randal Scott Funderburk, "An Investigation of a Drag Reducing Device for Tractor-Trailers", A Thesis in Mechanical Engineering, May 1996, 127 pages.

Randall L. Peterson, "Drag Reduction Obtained by the Addition of a Boattail to a Box Shaped Vehicle", NASA Contractor Report 163113, Aug. 1981, 32 pages.

Salari, "Heavy Vehicle Drag Reduction Devices: Computational Evaluation & Design", DOE Heavy Vehicle Systems Review, Apr. 2006, 24 pages.

Smith, et al., "U.S. Appl. No. 61/600,579, Rear-Mounted Retractable Aerodynamic Structure for Cargo Bodies", Published in: US.

U.S. Department of Energy, "Heavy Vehicle Systems Optimization", FreedomCAR and Vehicle Technologies Program, 2004 Annual Progress Report, Feb. 2005, 206 pages.

Machine translation of DE19524825 printed from the internet Nov. 3, 2010. 2 pages.

U.S. Appl. No. 60/927,614, titled "Aerodynamic Trailer With Sliding Rear Door", filed May 4, 2007 by Mark Roush.

U.S. Appl. No. 60/938,697, titled "Rear-Mounted Aerodynamic Structure for Truck Cargo Bodies", filed May 17, 2007 by Andrew F. Smith et al.

U.S. Appl. No. 61/039,411, titled "Rear-Mounted Aerodynamic Structure for Truck Cargo Bodies", filed Mar. 25, 2008 by Andrew F. Smith et al.

U.S. Appl. No. 61/065,490, titled "Self-Deploying Drag Reducing Device", filed Feb. 12, 2008 by Lee Telnack, et al.

U.S. Appl. No. 61/070,669, titled "Rounded Cargo Doors for Trailers and Trucks", filed Mar. 25, 2008 by Mark Roush.

U.S. Appl. No. 61/070,670, titled "Drag Reduction Arrangement for Cargo Trucks and Trailers", filed Mar. 25, 2008 by Mark Roush.

* cited by examiner

AERODYNAMIC STRUCTURES SECURED TO THE UNDERBODY OF CARGO BODIES

RELATED APPLICATIONS

This application is a divisional of U.S. patent application Ser. No. 13/623,858, filed Sep. 20, 2012, entitled AERODYNAMIC STRUCTURES SECURED TO THE UNDERBODY OF CARGO BODIES, now abandoned, which claims the benefit of U.S. Provisional Application Ser. No. 61/626,112, filed Sep. 20, 2011, entitled AERODYNAMIC STRUCTURES SECURED TO THE UNDERBODY OF CARGO BODIES, and also claims the benefit of U.S. Provisional Application Ser. No. 61/544,783, filed Oct. 7, 2011, entitled AERODYNAMIC STRUCTURES SECURED TO THE UNDERBODY OF CARGO BODIES, the entire disclosure of each of which applications is herein incorporated by reference.

FIELD OF THE INVENTION

The present invention relates to aerodynamic structures that are secured to the underbody of cargo bodies, for example, on trucks or trailers, and other aerodynamic structures to improve airflow around and under the cargo body.

BACKGROUND OF THE INVENTION

Trucking is the primary mode of long-distance and short-haul transport for goods and materials in the United States, and many other countries. Trucks typically include a motorized cab in which the driver sits and operates the vehicle. The cab is attached to a box-like cargo section. Smaller trucks typically include an integral cargo section that sits on a unified frame which extends from the front wheels to the rear wheel assembly. Larger trucks often include a detachable cab unit, with multiple driven axles, and a separate trailer with a long box-like cargo unit seated atop two or more sets of wheel assemblies. These truck assemblages are commonly referred to as "semi-trailers" or "tractor trailers." Most modern trucks' cabs, particularly those of tractor trailers, have been fitted with aerodynamic fairings on their roof, sides and front. These fairings assist in directing air over the exposed top of the box-like cargo body, which typically extends higher (by several feet) than the average cab roof. The flat, projecting front face of a cargo body is a substantial source of drag, above the cab roof. The use of such front-mounted aerodynamic fairings in recent years has served to significantly lower drag and, therefore, raise fuel economy for trucks, especially those traveling at high speed on open highways.

However, the rear end of the truck's cargo body has remained the same throughout its history. This is mainly because most trucks include large swinging or rolling doors on their rear face. Trucks may also include a lift gate or a lip that is suited particularly to backing the truck into a loading dock area so that goods can be unloaded from the cargo body. It is well-known that the provision of appropriate aerodynamic fairings (typically consisting of an inwardly tapered set of walls) would further reduce the aerodynamic profile of the truck by reducing drag at the rear face. The reduction of drag, in turn, increases fuel economy.

To improve the aerodynamics of a truck or trailer cargo body by reducing drag, several solutions (i.e. rear-drag-reduction devices) have been provided that focus on trucks having swinging doors, which are not always readily applicable to cargo bodies having rolling doors. For useful background information on aerodynamic structures for swinging cargo doors, refer to commonly assigned U.S. patent application Ser. No. 12/122,645, entitled REAR-MOUNTED AERODYNAMIC STRUCTURE FOR TRUCK CARGO BODIES, by Smith et al., and U.S. patent application Ser. No. 12/903,770, entitled REAR-MOUNTED AERODYNAMIC STRUCTURE FOR TRUCK CARGO BODIES, by Smith et al., which are both incorporated herein by reference.

Only recently has an effort been made to improve the aerodynamic efficiency of these vehicles with the user of underbody fairings or "skirt" devices to reduce the aerodynamic drag of the trailer. However, there is currently no device that extends to cover the region behind the bogeys through to the rear plane of the trailer. This is primarily due to the fact that the position of the bogeys are frequently adjusted based on loading scenario for a given trip as well as in accordance with some state laws that mandate specific locations of the bogeys.

Still a further challenge is to improve the airflow passing under the cargo body as this space is generally configured to optimize mechanical and clearance considerations rather than aerodynamic considerations. One particular problem affecting the solutions to this is the movability of the wheel bogeys (clusters of two-three-axle wheel sets at the rear of the cargo body/trailer), thus rendering it challenging to provide a stationary skirt that covers the underbody from bogeys rearwardly to the rear of the cargo body, so as to form a continuous bottom aerodynamic envelope for the body. More particularly, it is desirable to provide a mechanism that increases the aerodynamic effectiveness of the cargo body. It is also desirable to affect the airflow, for example, in relation to a rearwardly located pocket of the cargo body provided by a rear-mounted aerodynamic structure. To this end, it is desirable to direct air away from the particular pocket created by exemplary rear aerodynamic structures such as those generated by, for example, the above-incorporated U.S. patent application Ser. Nos. 12/122,645 and 12/903,770 to Smith.

It is further desirable to provide an aerodynamic skirt structure for the underbody that is adjustable and improves aerodynamic efficiency. It is also desirable to provide a structure that maintains improved airflow underneath the trailer at the rear of the trailer, thereby reducing drag.

SUMMARY OF THE INVENTION

This invention overcomes the disadvantages of the prior art by providing a continuous skirt that extends from the bogeys to the rear plane of the truck cargo body, thereby allowing for slidable adjustment of the bogeys forward and aft (rearward). The various embodiments of the invention allow for a retractable skirt to be attached permanently or semi-permanently to the bogeys and the rear plane of the truck cargo body, such that it is adjustable, yet can be moved if desired.

In an embodiment of the invention, the skirt is of a woven fabric material, and is wound around a drum inside of a canister. The drum is spring-loaded or otherwise biased in such a way to apply tension to the fabric at all times, and in all positions. The canister that contains said drum is attached rigidly to a subframe that mounts to the aft-most portion of the bogey chassis. The skirt is extended from the canister and is rigidly mounted to the rearmost portion of the truck cargo body. In the functionality of the invention, when the bogey is slidably adjusted from its aftmost position to its foremost position, the spring-loaded drum unwinds skirt fabric while maintaining a near-constant tension on the fabric during the entire range of motion. In the functionality of the invention, when the bogey is slidably adjusted from its foremost position to its aftmost position, the spring-loaded drum winds skirt fabric while maintaining a near-constant tension on the fabric during the entire range of motion.

In an embodiment of the invention, the skirt is composed of overlapping sections of rigid panel material hanging from one or more sliding tracks mounted to the underbody of the truck cargo body. The foremost panel section is mounted rigidly to a subframe that is mounted to the aftmost portion of the bogey chassis. The aftmost panel section is mounted rigidly to the rearmost portion of the truck cargo body. In the functionality of the invention, when the bogey is slidably adjusted from its aftmost position to its foremost position, the overlapping panels become exposed one after another to keep a continuous rigid skirt panel surface for the entire range of motion. In the functionality of the invention, when the bogey is slidably adjusted from its foremost position to its aftmost position, the overlapping panels become covered by one another to keep a continuous rigid skirt panel surface for the entire range of motion.

For several variations on this embodiment of the invention, in the regions forward of the canister but aft of the aftmost bogey tire, the invention provides for a rigid panel to be mounted to allow for access to the tire and wheel for repair or removal while improving aerodynamic benefic of the invention. In the region aft of the aft skirt mount but forward of the aft plane of the truck cargo body, which might contain a control box, such as for a lift-gate-style trailer, the embodiment of the invention contains provision for a rigid panel to be mounted to allow for full access to the control panel, while improving the aerodynamic benefit of the invention.

An aerodynamic structure for securing to a cargo body underbody comprises a skirt on each of opposing sides of the cargo body, each skirt being operatively connected on one end to wheel bogeys of the cargo body and on another end to a location adjacent to a rear frame of the cargo body, wherein the skirt is variably extendible and retractable to account for a change in positioning of the bogeys. In an illustrative embodiment, the aerodynamic structure further comprises a front fill panel operatively connected to the skirt that includes a biased element for biasing the skirt toward a front of the cargo body. The skirt is movable based upon a rolling action. The skirt is further flexible and is operatively connected to guide tracks along the cargo body that maintain a shape of the skirt. The aerodynamic structure as set forth in claim 4 wherein the tracks are attached to an underside of the cargo body. Guide rollers can further be employed to urge the skirt into a curved orientation. Each skirt can curve inwardly toward the centerline of the cargo body in a rearward direction and each skirt overlaps the other at a rearmost position.

Illustratively, the skirt can comprise a plurality of overlapping panels that slide with respect to each other along a track. The skirt can also comprise an expanding and contracting material. The expanding and contracting material is one of (a) an elastic fabric, (b) a network of panels having thick sections and flexible interposed thin sections therebetween, and (c) a segmented panel with living hinge material constructed in the manner similar to popular window blinds.

The skirt can comprise a fabric that is selectively taken up by and paid out (i.e. some of the fabric is let out) from a roller. The roller includes at least one of a manually operated and motorized tensioning mechanism that rotates the roller. Each skirt is one of (a) approximately parallel with a side of the cargo body, and (b) inwardly tapered in a rearward direction with respect to a centerline of the cargo body.

A rear fill panel can also be provided, located between an rear attachment location of the skirt and a location adjacent to an underride guard of the cargo body.

In an illustrative embodiment, the skirt tapers upwardly toward a bottom of the cargo body and away from a road surface in a rearward direction. A structure having an airfoil cross-section located along at least a portion of a horizontal bar of an underride guard of the cargo body can be provided.

In an illustrative embodiment, the skirt panel or panels can be folded up and in so that they rest parallel and directly beneath the trailer floor, allowing the rear bogeys to travel underneath them when the bogey is slidably adjusted from its aftmost position to its foremost position or vice versa.

BRIEF DESCRIPTION OF THE DRAWINGS

The invention description below refers to the accompanying drawings, of which.

DETAILED DESCRIPTION

An underbody fairing structure, flow extender or "skirt" extends from just rearward of the bogeys to the rear plane of a truck body to improve airflow surrounding, underneath and emanating from the cargo body. The aerodynamic skirt structure allows for slidable adjustment of the bogeys forward and aft/rearward without the need to remove the structure. The various embodiments of the invention allow for a retractable skirt attached permanently or semi-permanently between the bogeys and the rear plane of the truck cargo body, yet remains adjustable for varying bogey positioning. The skirt further prevents air from disadvantageously curling under the cargo body. In particular, the skirt assists in directing air out of the pocket created by the rear aerodynamic structures, for example the aerodynamic structures described in the commonly assigned '645 and '770 Smith applications incorporated by reference hereinabove.

Figure 1:
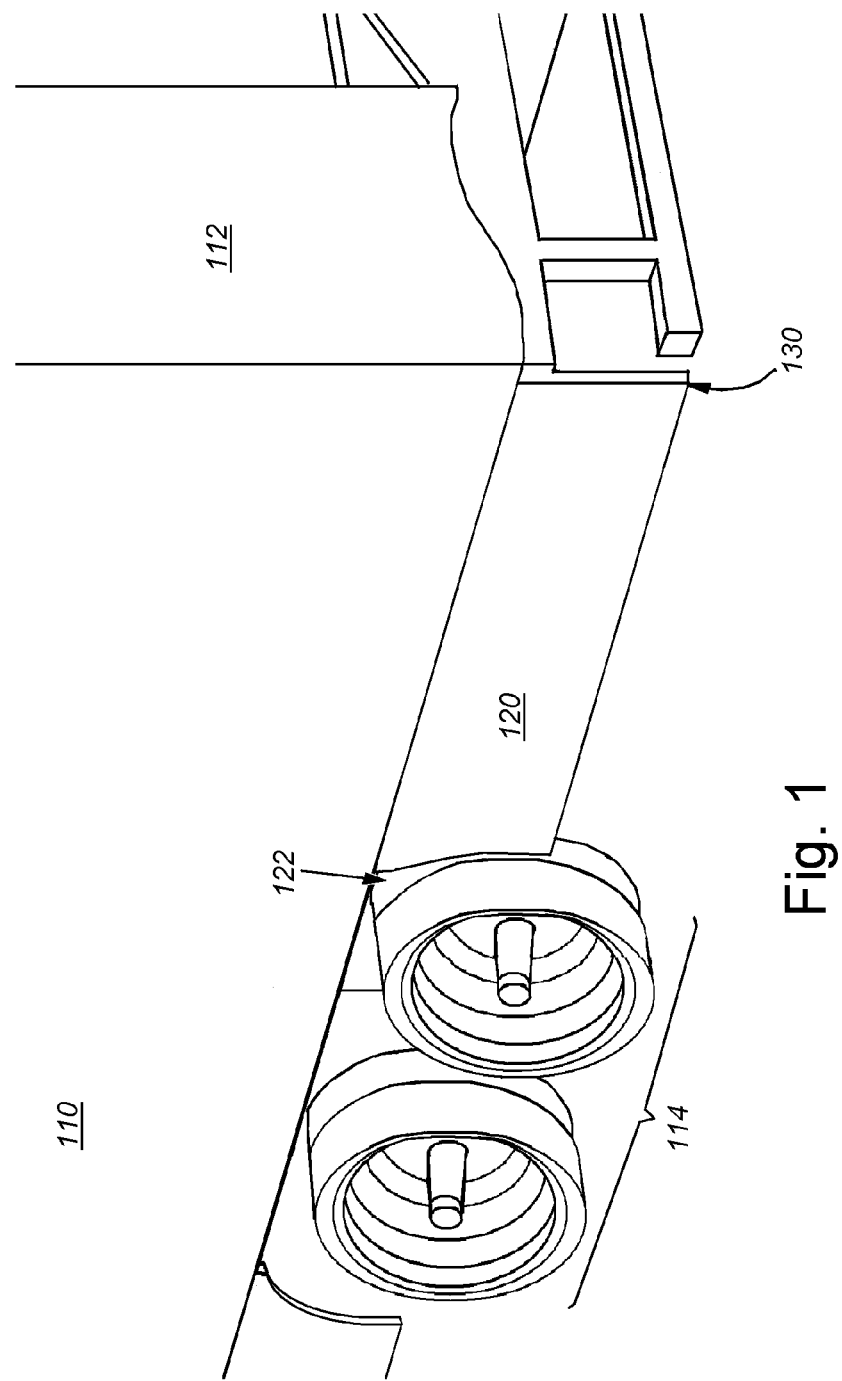
FIG. 1 is a perspective side view of an aerodynamic skirt structure secured to the underbody of a cargo body, according to an illustrative embodiment.
Figure 5:
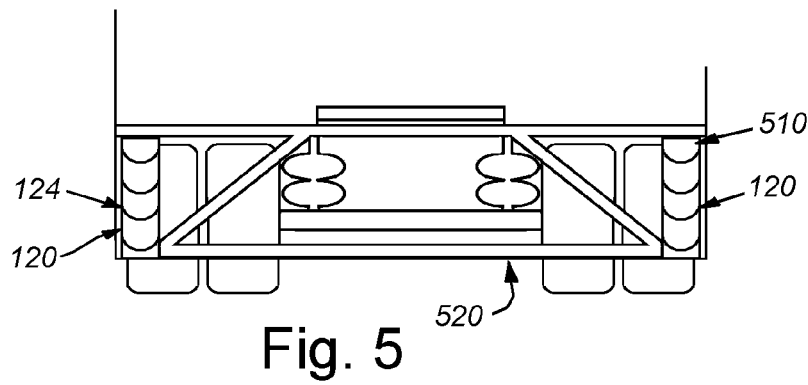
FIG. 5 is a rear view of a subframe for securing the aerodynamic skirt structure to the cargo body, according to the illustrative embodiment.

Referring to FIG. 1, a cargo body 110 is shown having a conventional rear-mounted side aerodynamic panel 112, for example as described in the commonly assigned '645 and '770 Smith applications incorporated by reference hereinabove. According to an illustrative embodiment, mounted rearward of the bogeys 114 is an aerodynamic skirt structure 120. The skirt 120 includes a front fill panel 122 with a spring-loaded spindle enclosure or compartment 124 for receiving the skirt 120. The skirt 120 is secured at its rearward end to post 130 or other supporting bracket of the cargo body. The front fill panel 122 is secured to the mud flap support or a subframe that replaces the mudflap frame, for example as shown in FIG. 5. Angle iron or other appropriate brackets can be employed to secure the axle piece to the frame or mudflap structure. With reference to incorporated '645 and '770 Smith patent applications, where such structures may omit lower panels, the skirt structure 120 provides an effective mechanism for improving the aerodynamics, by directing air away from the pocket created by the aerodynamic structure described in those applications.

The materials employed for the skirt 120 can be highly variable within ordinary skill and can include nylon, a tarp, a rubberized or plasticized canvas, a plastic sheeting, a tarp with a spring-loaded spindle, among other materials. The skirt 120 can also comprise vertical slats, instead of fabric, that roll up around the spindle. The thickness of the fabric skirt 120 can vary and desirably has at least some amount of elasticity. The fabric is durable to withstand rough terrain and to endure rough surfaces. Any material can be employed that provides the sufficient elasticity to allow the material to stretch while wrapped within the spring-loaded spindle.

Figure 2:
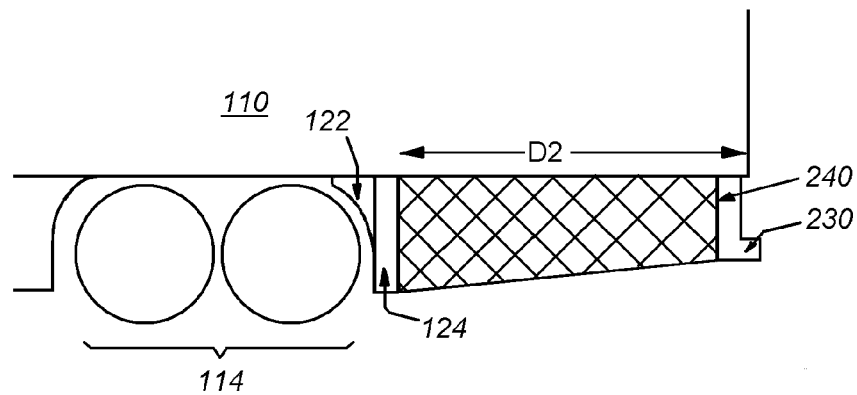
FIG. 2 is a side view of the aerodynamic skirt structure secured to the underbody of the cargo body, with the bogeys in the forward position, according to the illustrative embodiment.
Figure 3:
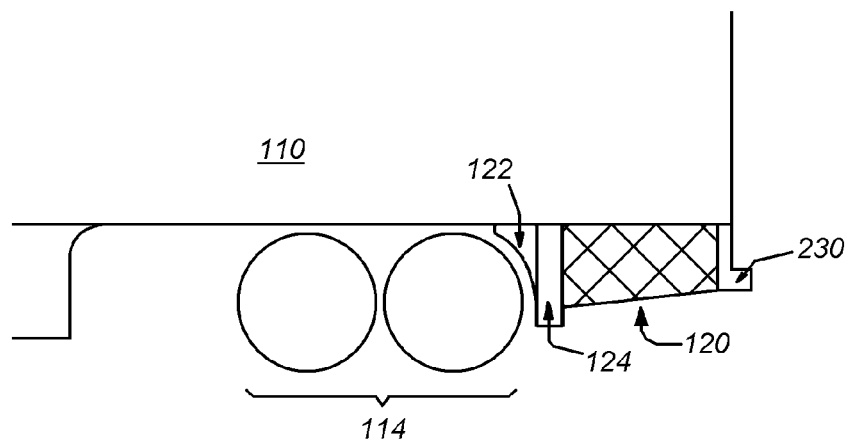
FIG. 3 is a side view of the aerodynamic skirt structure secured to the underbody of the cargo body, with the bogeys in the rearward position, according to the illustrative embodiment.

Reference is now made to FIGS. 2 and 3 showing the bogeys 114 in the forward and rearward position, respectively. FIG. 2 shows a side view of the skirt 120 with the bogeys 114 in the forward position. Given that the rear axles move forward and backward to accommodate for load leveling or state/local laws, this structure allows the skirt to be readily adjustable. In operation, a driver disengages the rear axles, releases the wheels, and pulls the trailer forward to be able to re-engage the wheels to place the bogeys at the desired location. Once the skirt 120 is mounted on the cargo body it is semi-permanent in that it is removable, but does not need to be modified to accommodate for varying position of the bogeys. The skirt 120 is shown with the bogeys 114 a distance D2 from the rear of cargo body 110 to the front fill panel 122, which provides clearance for the tire. Also included as part of the skirt 120 in this embodiment is a rear fill panel 230. The rear fill panel 230 is described in greater detail hereinbelow with reference to FIG. 6. As shown in FIG. 3, with the bogeys 114 in the rearward position, the skirt 120 is significantly shorter than D2 or FIG. 2.

Figure 4:
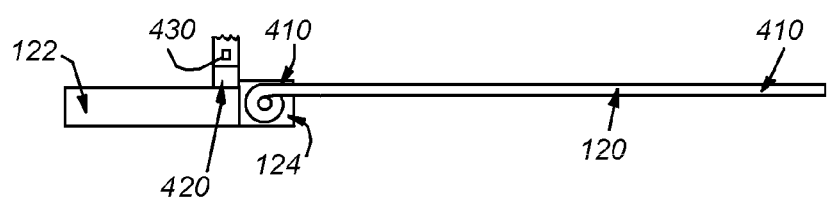
FIG. 4 is a top view of the aerodynamic skirt structure as mounted to the frame of the cargo body proximate the tires, according to the illustrative embodiment.

FIG. 4 is a bottom view of the skirt 120 including the front fill panel that improves (i.e. reduces) the gap between the bogeys 114 and the skirt 120. The skirt 120 is spring-loaded and biased closed within a container or other compartment 124 via a spring 410 or other appropriate biasing structure. The container 124 and corresponding front fill panel are secured via a vertical post or bracket 420 to the mud flap bar 430. Note the skirt 120 includes a hook 440 or other appropriate securing mechanism such as a hook or strap to secure to the underride guard. The securing member depends upon the structure of the cargo body, and can also be a more robust structure as desired for alternate uses. A rear fill panel, although not shown in FIG. 4, can also be employed, as described in greater detail hereinbelow.

FIG. 5 shows a rear cut-away view of a subframe 510 that can be installed (or provided direct from the manufacturer) which replaces a conventional mudflap structure. There is also shown an optional bracket/frame 520 disposed behind the bogeys for additional support if needed. The rolled fabric skirt 120 is disposed in 124 and shown on opposing sides of the cargo body, with the subframe 510 disposed rearwardly behind the bogeys.

Figure 6:
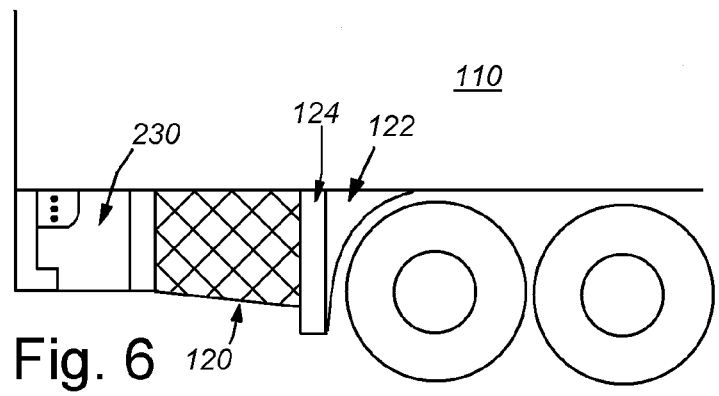
FIG. 6 is a side view of the fabric aerodynamic skirt structure mounted between the bogeys and the rear mount of the cargo body, in accordance with the illustrative embodiment.
Figures 6A, 6B:
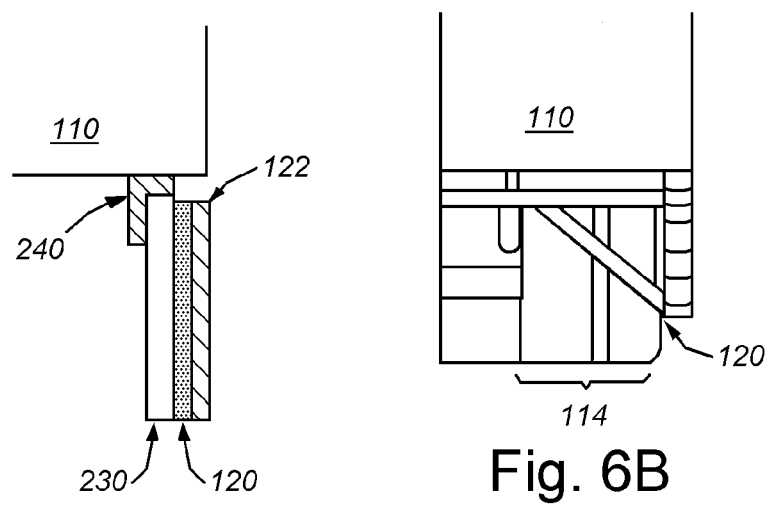
FIG. 6A is a cross-section taken through FIG. 6, showing the mount plate for the rear fill panel, according to the illustrative embodiment.
FIG. 6B is a cross-section taken through FIG. 6, showing the bogey chassis and fabric drum and associated subframe, according to the illustrative embodiment.

Reference is now made to FIGS. 6, 6A and 6B, showing, respectively, a side view of the fabric skirt 120 secured to a cargo body, a cross-sectional view of the rear mount and a cross-sectional view of the front mount. As shown in FIG. 6, the skirt 120 includes a front fill panel 122 which includes a canister 124 or other appropriate mechanism for retracting the skirt 120. The skirt structure also includes a rear fill panel 230 secured via mount 240 to the cargo body. The rear fill panel 230 allows the skirt 120 to terminate before the back-most stop structure of the cargo body. The rear fill panel 230 is desirably a solid panel that covers a control panel to provide improved protection therefore. The rear fill panel 230 also allows the skirt 120 to fully retract rearwardly such that it can extend to the rear underride guard. Trailers with underhanging structure at the rear end can be secured via hooks, welded angle iron or a clamp to the crossmembers on the underside of the trailer.

Figure 7:
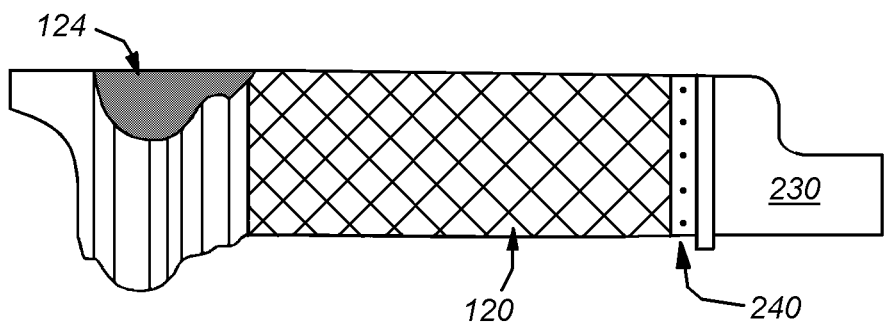
FIG. 7 is a side view of the inner side of the aerodynamic skirt structure, including a front fill panel, collector mechanism, and a rear fill panel, according to the illustrative embodiment.

FIG. 7 shows a more detailed view of the skirt 120 with front fill panel 122 and rear fill panel 230 as taken from an inside view of the overall skirt structure. The skirt 120 is constructed and arranged to be retracted into the container 124, which is secured just rearward of the bogeys and associated front fill panel, such that the skirt 120 is adjustable as the bogeys adjust. Note the mounting bracket 240 for securing the rear fill panel 230 to a rearward portion of the cargo body (although not shown).

Figure 8:
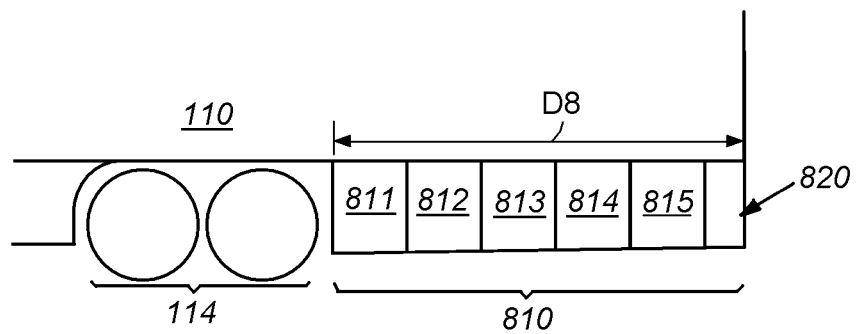
FIG. 8 is a side view of an aerodynamic sliding skirt structure comprising a plurality of panels that slide along a track, with the bogeys in the forward position, in accordance with an illustrative embodiment.
Figure 9:
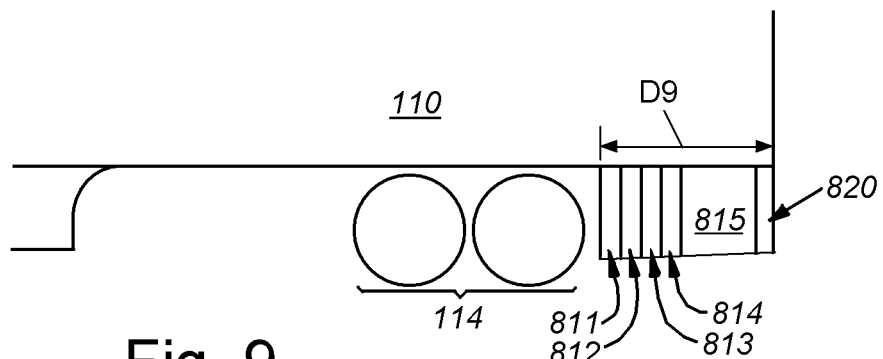
FIG. 9 is a side view of the aerodynamic sliding skirt structure employing sliding panels, shown with the bogeys in the rearward position, in accordance with the illustrative embodiment.
Figure 10:
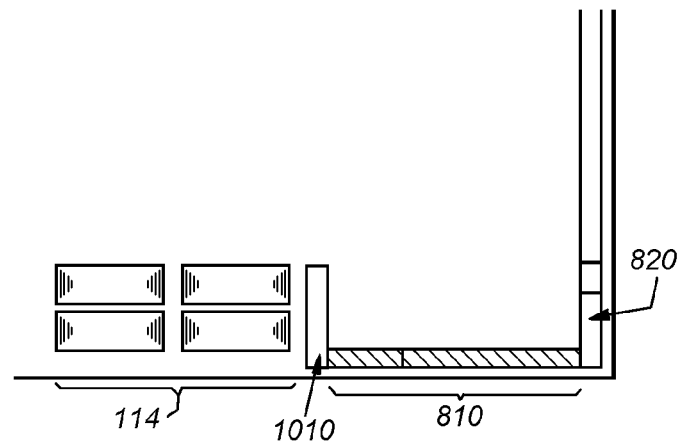
FIG. 10 is a top view of the aerodynamic sliding skirt structure mounted between the mud flaps and the rear mounting bracket, according to the illustrative embodiment.

Reference is now made to FIGS. 8-10 detailing a sliding skirt structure comprising a plurality of panels that slide along a track. As shown in FIG. 8, the bogeys 114 are in the forward position, disposed a distance D8 from the rear of the cargo body 110. The sliding skirt structure 810 includes a plurality of panels 811, 812, 813, 814 and 815 which are altogether secured rearward of the bogeys, for example to a subframe or mudflap structure, and to the rear underride guard 820. As shown in FIG. 9, the sliding skirt structure 810 has been retracted to account for the rearward positioning of the bogeys 114. The sliding skirt 810 is now a distance of D9 from the rear of the cargo body 110, which is less than the distance D8 of the bogeys 114 in the forward position. The adjustable skirt structure is thus highly variable to accommodate bogey location.

FIG. 10 is a bottom view of the sliding skirt structure 810 as secured rearward of the bogeys 114 to a rear mudflap guard 1010 on one end and at the rear underride guard 820 on an opposing end. Although not shown, the panels according to the sliding skirt embodiments can slide along a track at the top edge of the panels (i.e. the bottom edge of the cargo body) or there can be a pair of tracks, one at the top edge of the panel and another at the bottom edge of the panel, upon which the panels slide.

Figure 11:
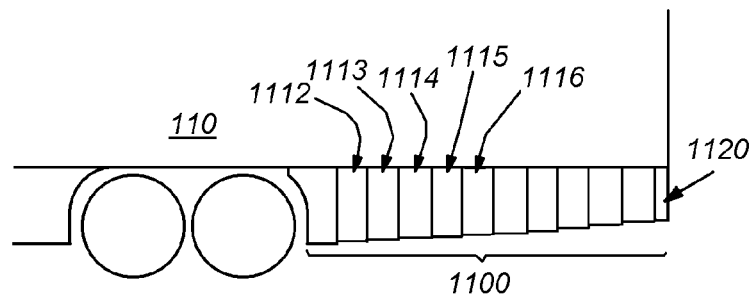
FIG. 11 is a side view of a canister-type aerodynamic sliding skirt structure employing a roll-up set of panels, according to an illustrative embodiment.
Figure 12:
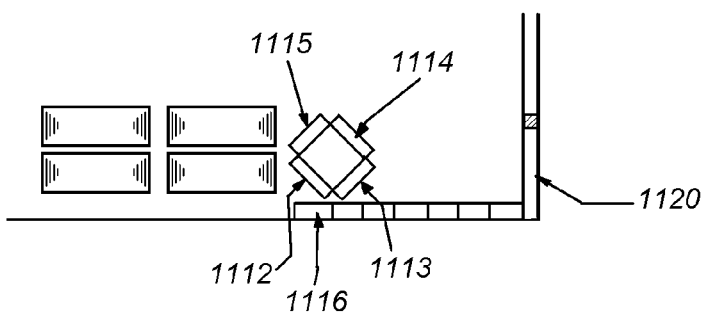
FIG. 12 is a bottom view of the aerodynamic sliding skirt structure of FIG. 12 employing a roll-up set of panels, according to the illustrative embodiment.

Reference is now made to FIGS. 11 and 12 showing another skirt arrangement in which a plurality of panels are slidable and rolled within a canister in a "riot gate" or "fish scale" embodiment. The rolling skirt arrangement 1100 includes a plurality of panels 1112-1116 which are rolled within a canister 1110 that also comprises a front fill flap. The panels roll up into the canister and are rigid to form a continuous surface from the rear wheels to the rear panel of the truck when deployed. The rolling skirt arrangement 1100 is secured at its rearward end to the rear underride guard 1120. The rolling skirt arrangement 1100 can comprise a polymer sheet, a composite plastic, stretched fabric over frameworks, fabric connecting fishtail, an umbrella or accordion-like folding arrangement, or other arrangement readily apparent to those having ordinary skill.

Figure 13:
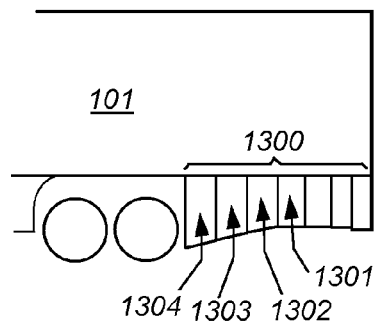
FIG. 13 is a side view of the aerodynamic sliding skirt structure employing parallel tracks for the panels, according to an illustrative embodiment.
Figures 13A, 13B:
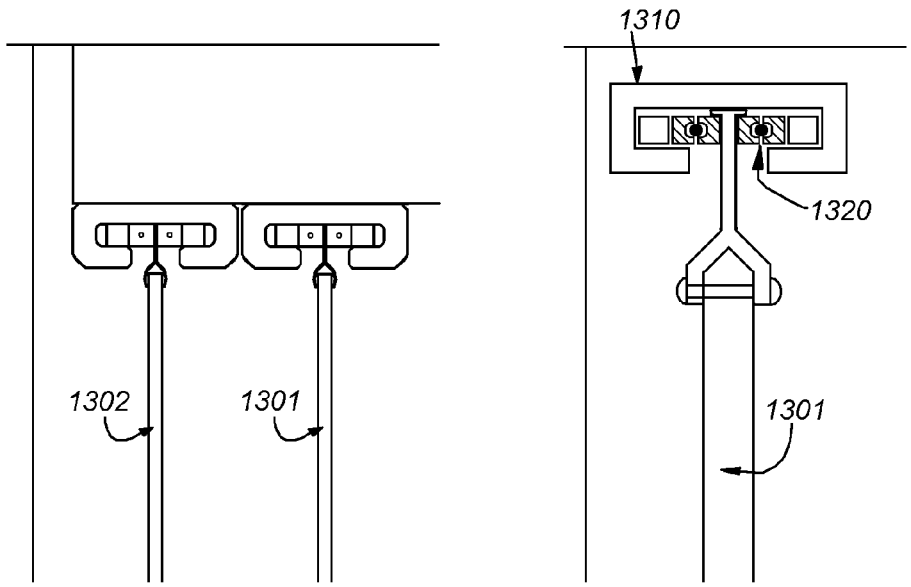
FIG. 13A is a cross-section taken through FIG. 13, showing the parallel tracks to allow for overlapping sliding.
FIG. 13B is a detailed view of the track and associated panel, according to the illustrative embodiment.

FIG. 13 shows still another sliding skirt embodiment in which parallel tracks are used to allow, for example, for overlapping sliding of panels. As shown in FIG. 13, a sliding skirt 1300 is secured to the underbody of a cargo body 101. The sliding skirt 1300 includes a plurality of sliding or segmented panels 1301, 1302, 1303 and 1304 which are each disposed on parallel tracks to allow for overlapping sliding of the panels. As shown in FIG. 13A, each panel 1301 and 1302 resides within a track. In even greater detail in FIG. 13B, the panel 1301 is shown as disposed within its track 1310 via a slide ball-bearing assembly 1320. These sliding panels likewise provide improved aerodynamic efficiency of the cargo body.

Figure 14:
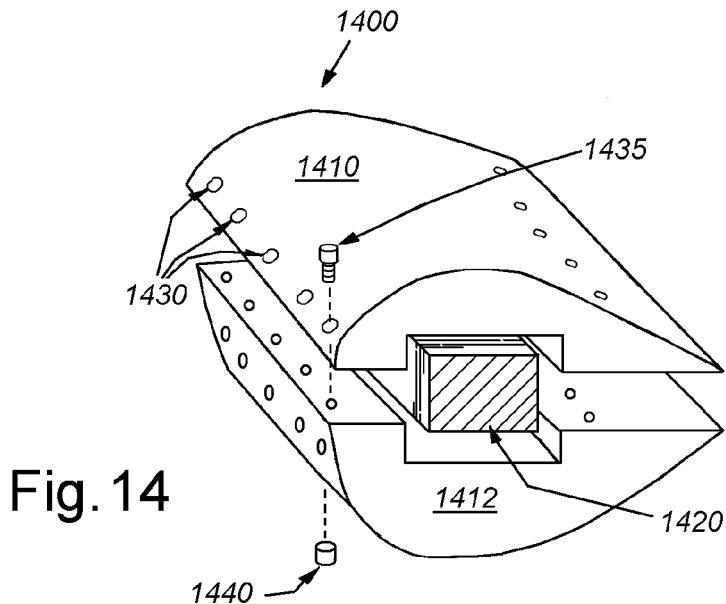
FIG. 14 is a front perspective view of a rear underride drag structure for mounting on an underride guard, in accordance with another illustrative embodiment.
Figure 14A:
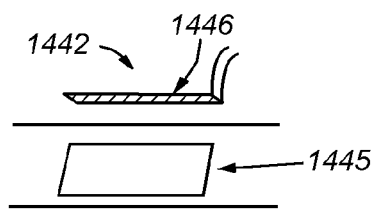
FIG. 14A is a perspective view of a first alternate clamping mechanism for the rear underride drag structure, in accordance with the illustrative embodiment.
Figure 14B:
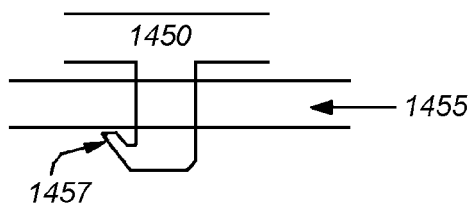
FIG. 14B is a perspective view of a second alternate clamping mechanism for the underride drag structure, in accordance with the illustrative embodiment.
Figure 15:
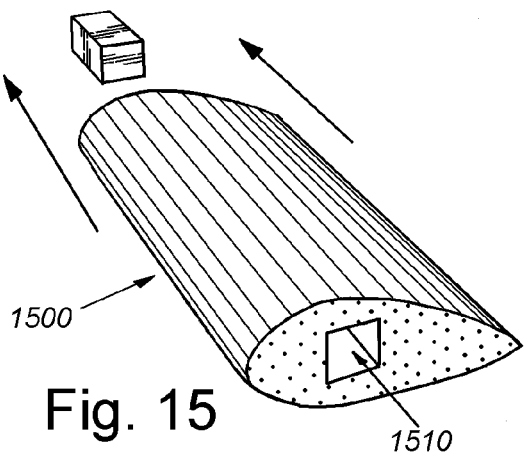
FIG. 15 is a front perspective view of a foam rear underride drag structure for sliding onto an underride guard, in accordance with the illustrative embodiments.

Reference is now made to FIGS. 14, 14A, 14B and 15, showing a "rear drop" aerodynamic structure for mounting to the trailer rear underride guard to further improve aerodynamic structures. In particular, these rear drop aerodynamic structures improve aerodynamic efficiency by directing airflow surrounding the rear of the vehicle and are particularly useful when combined with the illustrative sliding skirt embodiments described herein. FIG. 14 shows a rear drop structure 1400 emulating a "clamshell" design having an upper half 1410 and a lower half 1412 which are secured to the trailer rear underride guard 1420 via appropriate holes 1430 through which bolts 1435 are driven and secured by corresponding nuts 1440. FIG. 14A shows an alternate clamping mechanism which includes an upper protrusion 1442 for engaging a hole 1445 and secured in place by hook 1446. FIG. 14B shows yet another clamping mechanism which includes the top half 1450 that extends through the bottom half 1455, and the top half includes a protrusion with a hook 1457 for securing the top half and bottom half together. FIG. 15 shows a foam slip-on design for the rear drop structure for securing to the rear underride guard 1420. The foam slip-on structure 1500 includes a hole 1510 constructed and arranged to engage the guard 1420. The slip-on can be secured via appropriate bolts, rivets, high-tension adhesive, or other appropriate securing mechanism. The rear drop structures are particularly useful to replace a bottom panel or in addition to other pre-existing aerodynamic structures. The rear drop structures significantly improve airflow at the rear of a cargo body.

Figure 16:
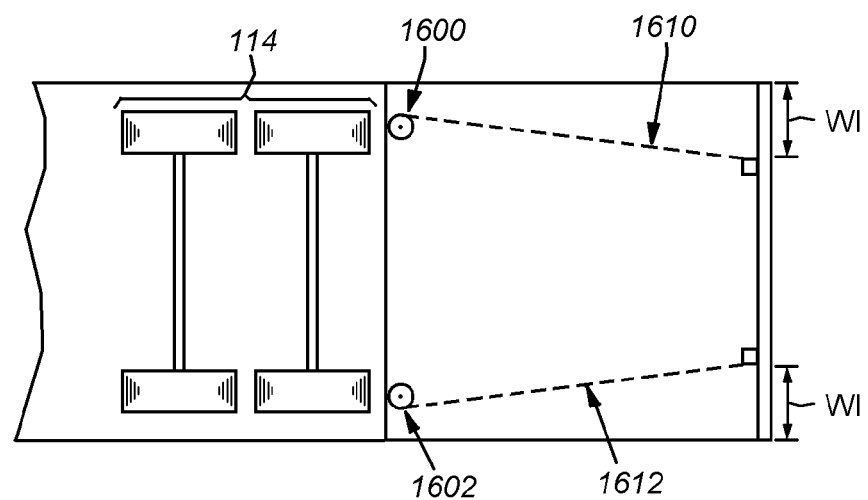
FIG. 16 is a bottom view of a fabric spun skirt having a tapered line of extension so as to attach to the underride guard inward of the ends of the trailer, according to an illustrative embodiment.

FIG. 16 shows a bottom view of a cargo body having bogeys 114 with container 1600, 1602 for respective skirts 1610 and 1612. As shown, the skirts 1610 and 1612 are tapered in slightly to secure to the underride guard at an inward width (WI) from the approximate outer edge of the trailer body/override guard of approximately two (2) feet. This arrangement further enhances the aerodynamic efficiency by reducing drag and improving the flow of airflow. This is particularly useful when combined with the rear teardrop structures, for example as shown in FIGS. 14 and 15 and described herein.

Figure 17:
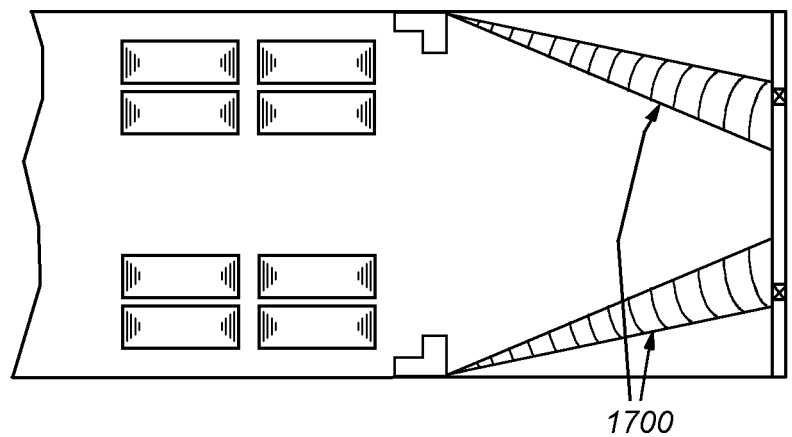
FIG. 17 is a side perspective view of an aerodynamic skirt structure secured to the underbody of a cargo body, defining an inwardly angled panel with the bottom curved up, according to an illustrative embodiment.

In a further embodiment as shown in FIG. 17, the skirt assembly 1700 can also angle inwardly and the bottom edge curves up slightly. The angled skirt assembly, when illustratively combined with the above-described rear teardrop structures on the outer legs of the override assembly, has been shown in wind tunnel tests to improve fuel efficiency by at least 2%, and thus overall provides a highly desirable enhancement to the aerodynamic efficiency. It should be noted that the slides or other framework structures can provide a curvilinear shape to the inwardly tapered structure contemplated herein. In various embodiments, this arrangement can further enhance aerodynamic efficiency. Likewise, the inwardly tapered and/or tapered-curvilinear structure can be formed using the above-described fish-scale construction.

Figure 18:
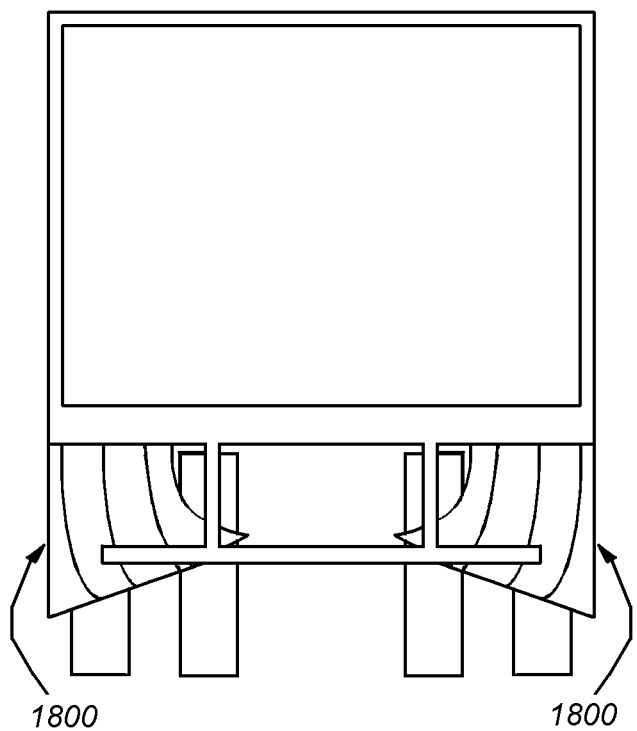
FIG. 18 is a rear view of the flow extender as extended rearwardly, the panels/fabric makes an angle inward and upward to terminate at or before the underride guard, according to the illustrative embodiment.

With reference further to FIG. 18, the inwardly tapered (or other) rear aerodynamic skirt, can be inwardly directed along the vertical direction, as well as the horizontal direction described above. This effects a somewhat frustoconical shape to the structure. The inward vertical taper can be defined linear (i.e. planar as shown) or curvilinear.

Fabric Trailer Skirt Panel with Tensioner Assembly

Figure 19:
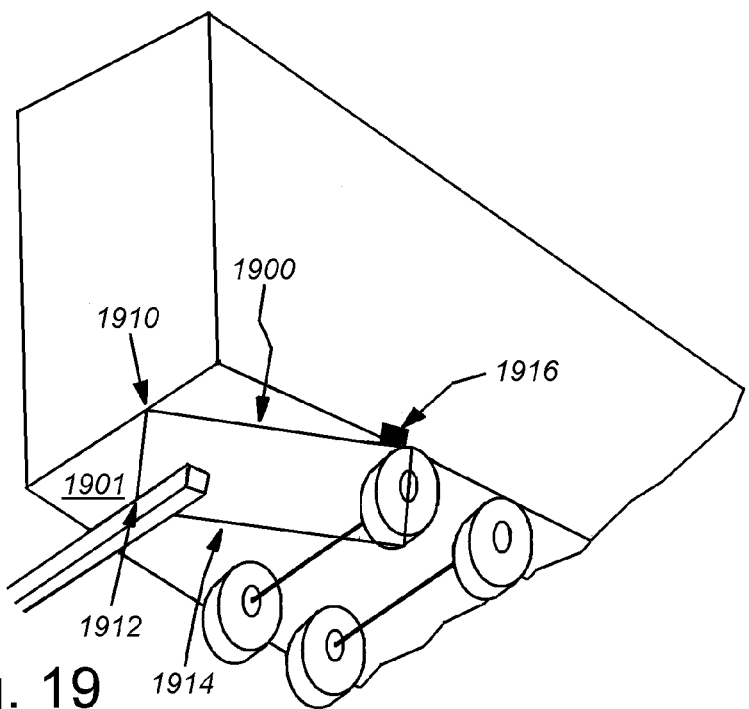
FIG. 19 is a perspective bottom rear view of a fabric skit having a tensioning mechanism and a plurality of secure points where the fabric skirt is secured to the trailer box, in accordance with an illustrative embodiment.
Figure 20:
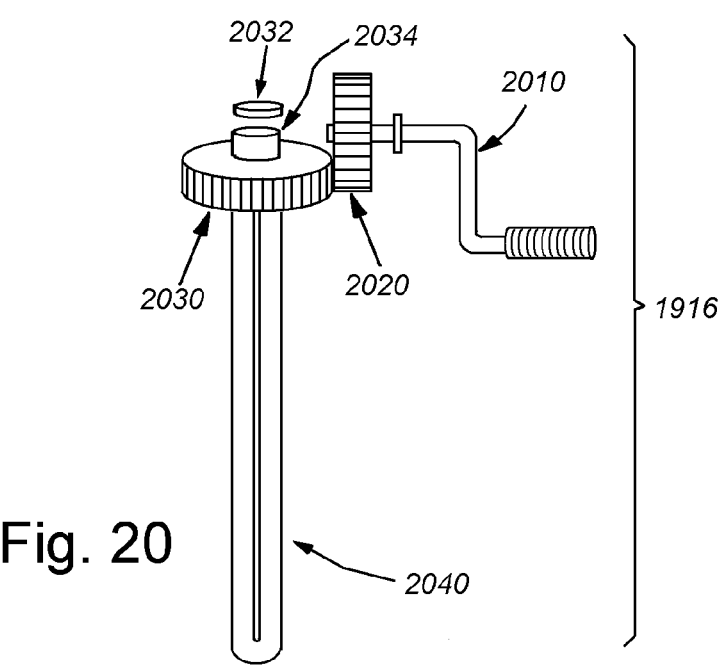
FIG. 20 is a perspective view detailing an exemplary tensioning mechanism for applying tension to a fabric skirt, in accordance with an illustrative embodiment employing a gear-driven tensioner.

Referring now to FIGS. 19 and 20, a fabric skirt panel 1900 is shown that is fixed to the underside of the trailer body 1901 at secured points 1910, 1912 and the tensioner box 1916. The fabric can be rolled up and tensioned by a tensioner assembly 1916 that applies tension to the fabric 1914. With reference to FIG. 20, the tensioner assembly 1916 allows the driver or other individual to either manually (via crank 2010, for example) or automatically (non-manually) utilize the tensioner assembly to ensure rigidity of the trailer skirts. Additionally, the tensioner assembly assists in ensuring adjustability during installation of the fabric skirt 1900. The tensioner assembly 1916, as shown in greater detail in FIG. 20, includes a crank 2010 that is typically located proximate the bogeys, and drives a gear 2020 which in turn rotates gear 2030. The gear 2030 includes a one-way freewheel 2032 and a torsional spring 2034 that is biased closed. The rotation of gear 2030 causes the shaft 2040 to rotate. The fabric skirt is mounted to the shaft 2040 such that the skirt winds around the shaft 2040 to apply tension to the skirt 1900. Although depicted as a gear-driven tensioner comprising two gears, the tensioner assembly can comprise any appropriate gears and/or pulleys and associated cabling to achieve the desired tensioning on the fabric skirt panel 1900, thereby achieving the desired length of the fabric skirt in accordance with movement of the bogey position via the crank 2010.

Rigid Elements in Fabric Skirt Panels

Figure 21:
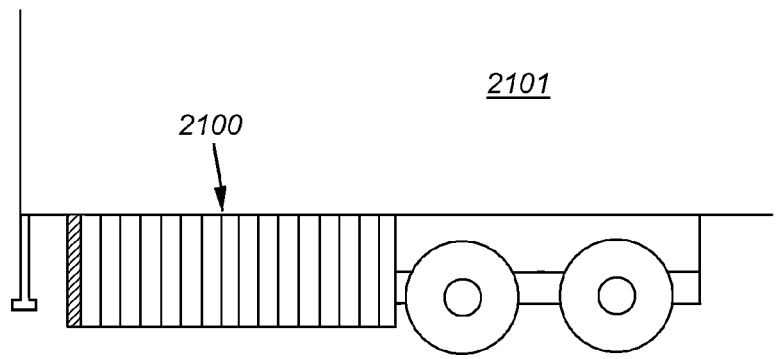
FIG. 21 is a side view of an aerodynamic skirt structure mounted between the bogeys and the rear mount of the cargo body and including reinforced fabric, in accordance with the illustrative embodiment.
Figure 22:
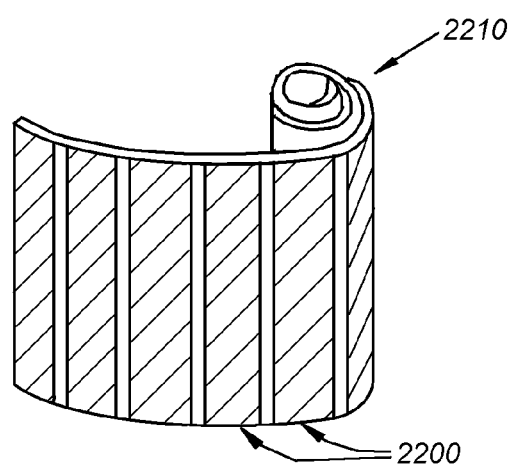
FIG. 22 is a perspective view of a reinforced fabric skirt, shown partially rolled up, in accordance with an illustrative embodiment.

Reference is now made to FIGS. 21 and 22 showing illustrative embodiments of an aerodynamic skirt structure mounted between the bogeys and the rear mount of the cargo body and including reinforced fabric. The reinforced fabric 2100 is secured to the underside of the trailer body 2101 in accordance with any of the embodiments shown and described herein. The fabric skirt, as shown in greater detail as partially rolled-up in FIG. 22, is reinforced by adhering, sewing, or otherwise affixing segments, ribs, inserts, or other rigid elements 2200 to the material. The segments are small enough in width that the fabric can be rolled up into a compact package 2210.

Sectioned Skirt Panel

Figure 23:
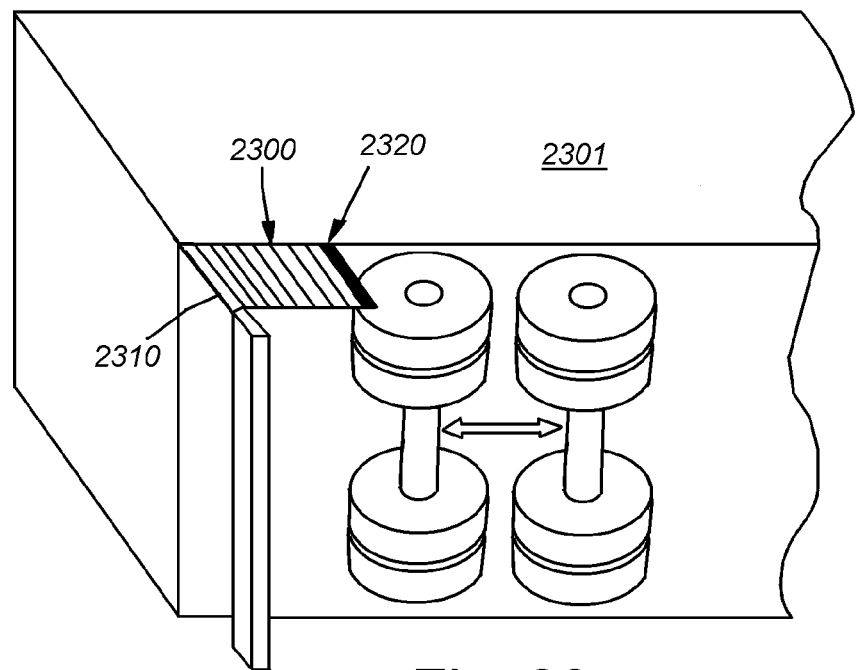
FIG. 23 is a perspective bottom view of a skirt mounted between the bogeys and the rear underride guard, in accordance with an illustrative embodiment.
Figure 24:
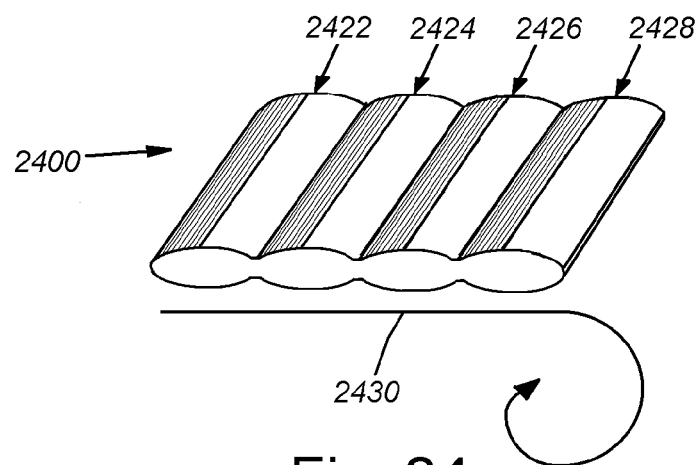
FIG. 24 is a perspective view of a fully extended skirt employing a plurality of panels having thin and thick sections, in accordance with an illustrative embodiment.

Referring to FIG. 23 is a perspective bottom view of a skirt mounted between the bogeys and the rear underride guard, in accordance with an illustrative embodiment. The skirt can comprise flexible panels, fabric, or other materials known in the art. A network of panels 2300 is secured to the underside of a trailer cargo body 2301 by securing the panel to the rear underride guard at 2310 and at 2320 proximate the rear bogeys. As shown in greater detail in FIG. 24, the semi-rigid panel comprises multiple segments 2402, 2404, 2406, 2406 of larger cross sectional area which are interconnected by multiple segments 2422, 2422, 2424, 2426. The multiple smaller segments 2422, 2422, 2424, 2426 allow the panel 2300, as a whole, to bend and roll up (in the direction 2430 show in FIG. 24). The rolled up panel shortens the deployed panel length to clear the bogey as its position is moved rearward toward the back of the trailer body. In an illustrative embodiment, the segmented panel has a living hinge material, constructed in the manner similar to popular window blinds. In an illustrative embodiment, the skirt fabric can be selectively taken up by and paid out (i.e. some of the fabric is let out) from a roller.

Further Structures for Panel Assemblies

Figure 25:
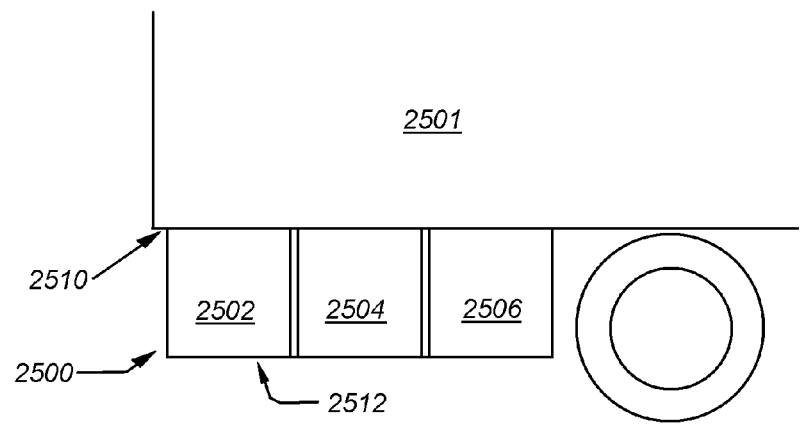
FIG. 25 is a perspective view of overlapping sliding panels secured to the underbody of the cargo body, in accordance with an illustrative embodiment.
Figure 26:
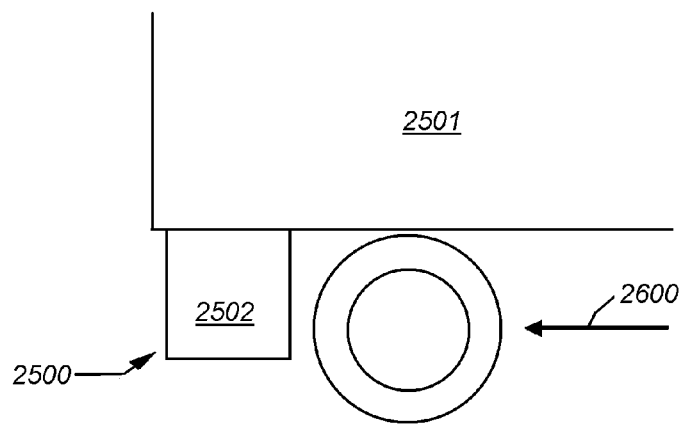
FIG. 26 is a perspective view of overlapping, stacked panels shown in the stacked position as secured to the underbody of the cargo body, in accordance with the illustrative embodiments.

Reference is now made to FIGS. 25-29 showing various arrangements for a panel assembly in which the panels can slide, telescope, or stack together when the rear wheels (and associated bogeys) as slid backwards. FIG. 25 is a perspective view of overlapping sliding panels 2500 secured to the underbody of the cargo body 2501, in accordance with an illustrative embodiment. The sliding panels 2502, 2504, 2506 are secured to the underside of the cargo body 2501 and include a top seal 2510 and an intermediate seal 2512, disposed between the panels to provide interconnectivity, sealing and allow for over-lapping sliding of the panels. As shown in FIG. 26, as the bogeys are slid rearward (in the direction of arrow 2600), the panels 2502, 2504, 2506 overlap and slide together such that one panel, such as 2506, becomes the outermost panel, and the remaining panels are behind the panel 2506.

Figure 27:
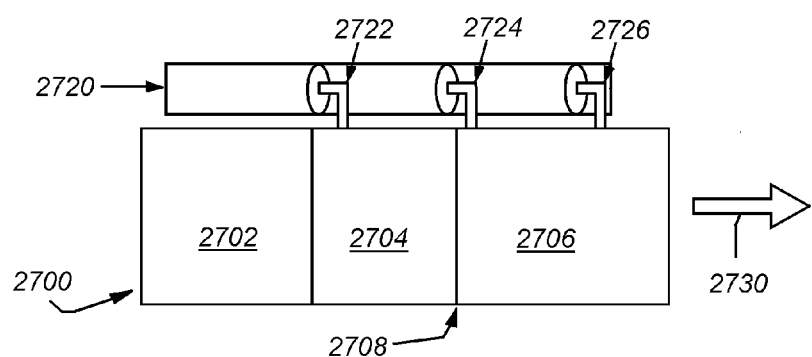
FIG. 27 is a perspective view of a multiple-panel system where the panels are slidable and employ a roller and rolling track, in accordance with the illustrative embodiments.

FIG. 27 is a perspective view of a multiple-panel system where the panels are slidable and employ a roller and rolling track, in accordance with the illustrative embodiments. The panel assembly 2700 includes panels 2702, 2704, 2706 sealed therebetween by a seal 2708, and which are each slightly over-lapping in at least a portion of the panel to maintain an air-tight seal through the use of a deformable elastic material, or other appropriate material known in the art. The panels are each supported by and slidable within a rolling track 2720 that the roller assemblies 2722, 2724, 2726 reside, respectively, for the panels 2702, 2704, 2706. When the bogeys slide forward, panels slide forwardly as well (in the direction of arrow 2730 into an extended array position (or a plurality of different positions) in order to lengthen the covered length when the bogey position changes. The panels can be locked in place, or held in place by springs (not shown) at the desired position.

Figure 28:
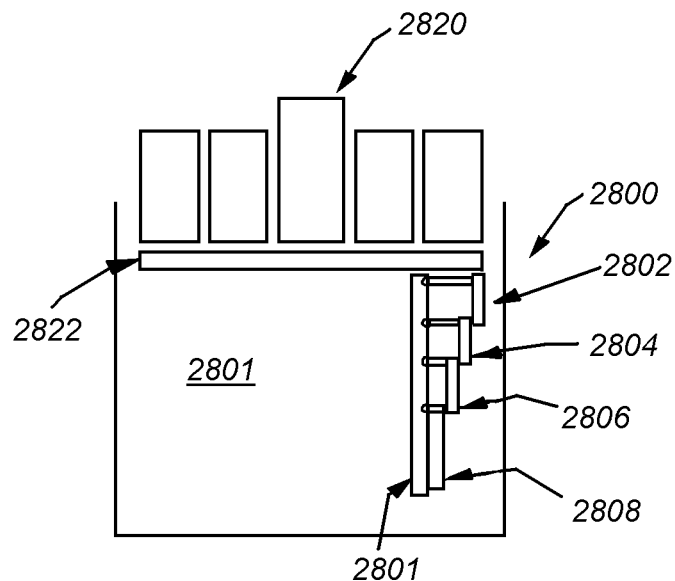
FIG. 28 is a bottom perspective view of a flow extender arrangement employing over-lapping panels, in accordance with the illustrative embodiments.
Figure 29:
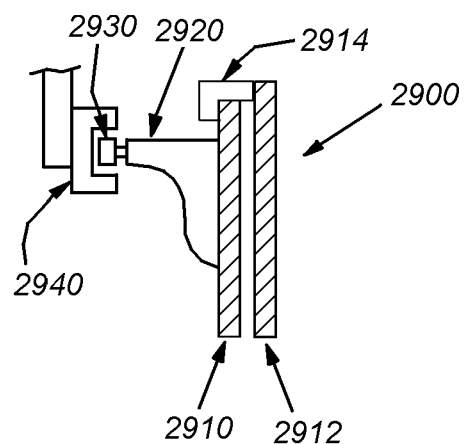
FIG. 29 is a cross-sectional diagram as taken through the over-lapping figures and showing the panel and track arrangement in greater detail, in accordance with the illustrative embodiments.

FIG. 28 is a bottom perspective view of a flow extender arrangement employing over-lapping panels, in accordance with the illustrative embodiments. As shown, the panel assembly 2800 is mounted to the underside of the cargo body 2801. The panel assembly 2800 includes rolling panels 2802, 2804, 2806 and a fixed panel 2808. The rolling panels 2802, 2804, 2806 are secured by rollers within the rolling track 2810, as shown in greater detail with reference to FIG. 29. Referring back to FIG. 28, the panel assembly 2800 is secured rearward of the rear bogey chassis 2820 and the rear bogey support 2822. Referring now to FIG. 29, a cross-sectional diagram as taken through the over-lapping figures and showing the panel and track arrangement is shown in greater detail, in accordance with the illustrative embodiments. The overlapping panel assembly 2900 includes a panel 2910 and an overlapping panel 2912 (the support and roller for the over-lapping panel 2912 are not shown). The panel 2910 is supported by a hooked or curved bracket 2914. A support 2920 is secured to the panel 2910 and to a roller 2930 that resides within a rolling track 2940, in accordance with the illustrative embodiments shown and described herein.

Flexible Panels with Rollers

Figure 30:
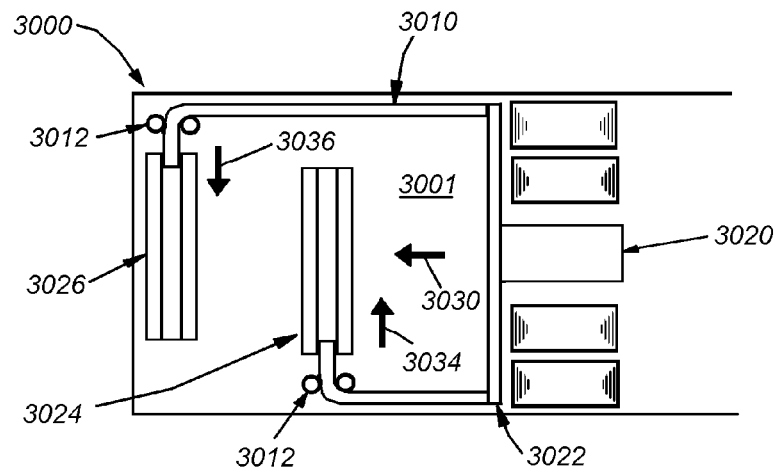
FIG. 30 is a perspective bottom view of flexible panels having guides and/or channels to control panel movement as bogey chassis is moved into various positions, in accordance with the illustrative embodiments.

Reference is now made to FIGS. 30-33 detailing various embodiments of flexible panels that employ rollers to force bends in the panels at predetermined positions as the rear wheels of the trailer are slid backwards. Referring to FIG. 30, a perspective bottom view of flexible panels with rollers that engage guides and/or channels to control panel movement as bogey chassis is moved into various positions, in accordance with the illustrative embodiments, is shown. The panel assembly 3000 is secured to an underside of the cargo body 3001 and includes a flexible panel 3010 that is guided by rollers 3012. The panel 3010 is secured on one end to the bogey chassis 3020 and more particularly the bogey chassis frame 3022, and on the other end is guided into the channels 3024. As the bogey chassis frame 3022 is slid rearward (in the direction of arrow 3030), the panel 3010 is correspondingly slid into the channel 3024 (as shown by arrow 3034) and into the channel 3026 (as shown by arrow 3036). Accordingly, the panel assembly 3000 is moved along with the bogey chassis movement. The guide rollers and channels are used to control the panel movement as the bogey chassis is moved into various positions. The guides are also used to maintain a flat and stiff outboard surface for maximum aerodynamic benefit.

Figure 31:
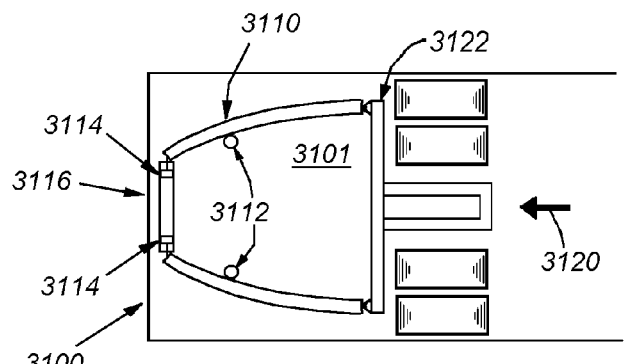
FIG. 31 is a perspective bottom view of a flexible panel and track arrangement in which the bogey is in the forward bogey chassis position, according to the illustrative embodiments.

FIG. 31 is a perspective bottom view of a flexible panel and track arrangement in which the bogey is in the forward bogey chassis position, according to the illustrative embodiments. As shown, the panel assembly 3100 is mounted to an underside of the cargo body 3101. The flexible panel 3110 is secured at both ends to a roller 3114 that rolls within a rolling track 3116. The panel assembly 3100 includes a pair of rollers 3112 that are used to guide the flexible panel 3110 into the track 3116. The flexible panel 3110 is secured to the bogey chassis 3120 along the frame 3122.

Figure 32:
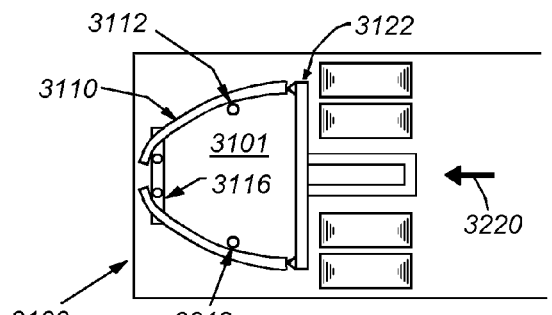
FIG. 32 is a perspective bottom view of a flexible panel and track arrangement in which the bogey is in the rear bogey chassis position, in accordance with the illustrative embodiments.

FIG. 32 is a perspective bottom view of a flexible panel and track arrangement in which the bogey is in the rear bogey chassis position, in accordance with the illustrative embodiments. As shown, the bogey chassis has moved (in the direction of arrow 3220) and accordingly, the rollers 3114 have rolled into the track 3216.

Figure 33:
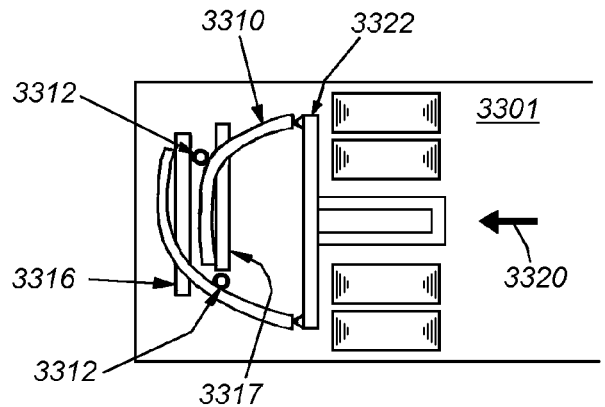
FIG. 33 is a perspective bottom view of a panel and track arrangement in which the bogey is in a rear bogey chassis position and there is a track for receiving each end of the fabric material, in accordance with an illustrative embodiment.

FIG. 33 is a perspective bottom view of a panel and track arrangement in which the bogey is in a rear bogey chassis position and there is a track for receiving each end of the fabric material, in accordance with an illustrative embodiment. As shown, the panel assembly is secured to an underside of the cargo body 3301. The panel 3310 is secured at one end to the bogey chassis bar 3322 and to the rollers 3312 which reside within tracks 3316, 3317. As the bogey chassis is in the rear position shown in FIG. 33 by the arrow 3320, the panel 3310 has retracted into the tracks 3316, 3317 so as to provide the desired position of the bogey chassis. Illustratively, the tracks 3316, 3317 are fixed to the trailer 3301, and the flexible panels are fixed to the bogey chassis. The panel guide rollers are placed in positions that prevent binding, contact, rubbing or other undesired consequences of the panels, while ensuring proper panel movement. The rollers are also placed in positions which ensure proper panel positions for maximum aerodynamic drag reduction.

Fixed Panel that Moves with Bogey Chassis

Figure 34:
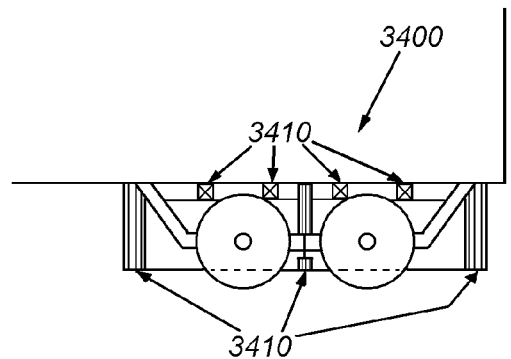
FIG. 34 is a perspective side view of a fixed panel that moves with the bogey chassis, in accordance with an illustrative embodiment.
Figure 35:
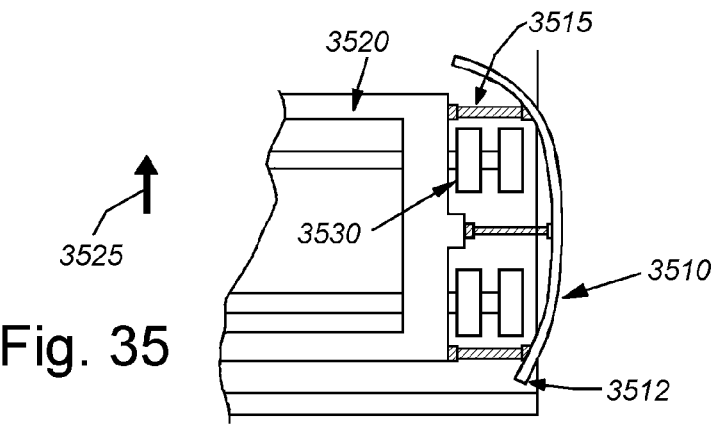
FIG. 35 is a bottom perspective view of a panel supported underneath a cargo body so as to move with the bogey chassis in accordance with an illustrative embodiment.

FIG. 34 is a perspective side view of a fixed panel that moves with the bogey chassis, in accordance with an illustrative embodiment. As shown, the fixed panel assembly 3400 covers the rear wheels but does not extend more than approximately 24 inches rearward. As shown in FIG. 35, the panel 3510 tapers inward at the rear 3512. It is expressly contemplated that a flat panel or other structured panel within ordinary skill can be employed. The fixed panel assembly 3400 is secured to the vehicle body at a plurality of panel fixing points 3410. The panel moves with the bogey chassis and is fixed to it in various places. The rear of the panel tapers inward (3512, toward the trailer centerline) to reduce rear drag. The panel covers the outside faces of the wheels/tires. The pane is easily removed or includes removable sections for tire replacement. The panel is supported so that it does not contact any wheels/tires, but is flexible in other areas. Referring to FIG. 35, the panel is secured to the truck 3530 and more particularly the bogey chassis 3520 by use of panel supports 3513 that move with the bogey chassis. To provide maximum clearance with the wheels and tires, the panel could be located flush with or outboard of the trailers sides, as long as full regulatory compliance is met.

Fixed Panel with Moving Supports

Figure 36:
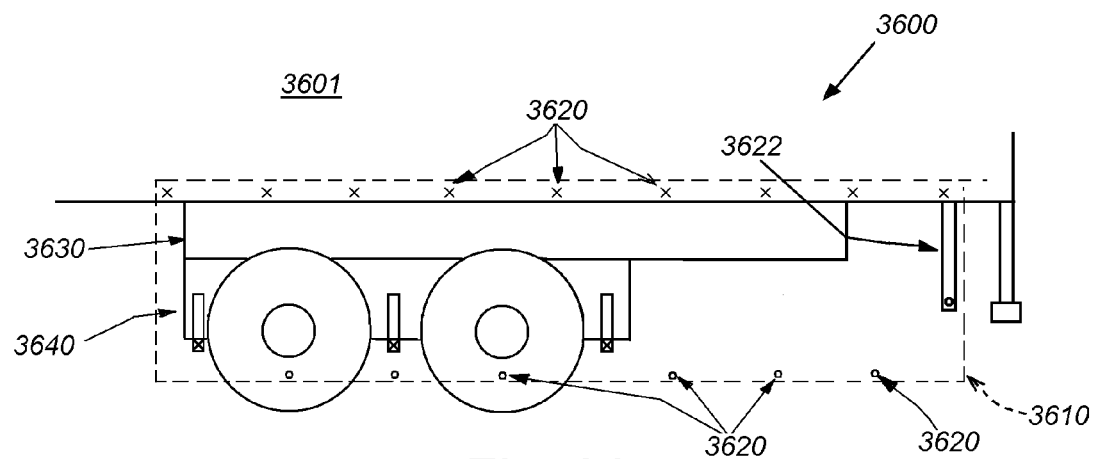
FIG. 36 is a perspective view of a fixed panel having moving supports in accordance with an illustrative embodiment.

Reference is now made to FIG. 36 showing a perspective view of a fixed panel having moving supports in accordance with an illustrative embodiment. As shown, the fixed panel assembly 3600 is secured to the underside or sidewall of a trailer cargo body 3601. The fixed panel assembly 3600 includes a fixed panel 3610 (represented by the dotted line) and defines a plurality of panel fixing positions 3620 for adjustable bogey chassis positions. The panel 3610 is illustratively substantially flush with the side of the trailer 3601. The panel is fixed in place at the rear and along its upper seam at points 3620 and at fixed support 3622. Illustratively, although not shown, additional rigidity members can be fixed to the underside of the trailer or the rear wheel chassis but which have sliding mounts on the fixed panel (with respect to the bogey chassis 3640). In accordance with the illustrative embodiment, the panel is fixed at the front to the fixed support 3622 and at the rear to the trailer frame 3630. It is also fixed along the top edge at fixed points 3620 which can protrude from the side of the trailer based on the wheel/tire clearance. The panel has holes, slots, or fastening clip points along its length to secure the bottom edge. Supports which are fixed to the bogey chassis are fastened to these points when they line up together as the bogey is repositioned along its track. These supports maintain panel rigidity along the bogey chassis so that the panel does not contact the wheels/tires. Additional supports (not shown) for the panel bottom edge can slide into a fixing position or be added to support larger unsupported lengths.

Rigid Panel Hingedly Secured to Trailer Underside

Figure 37:
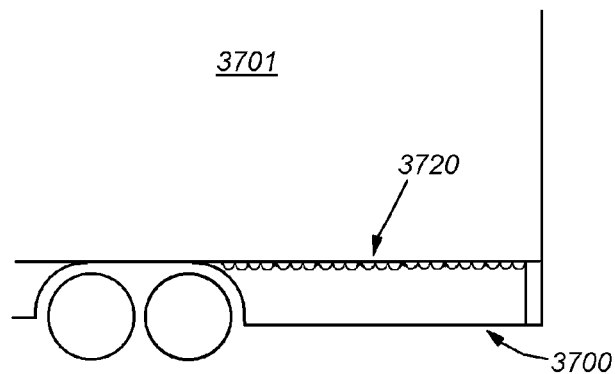
FIG. 37 is a perspective side view of a rigid panel that is hingedly secured proximate an outer edge of the underside of the trailer, in accordance with an illustrative embodiment.
Figure 38:
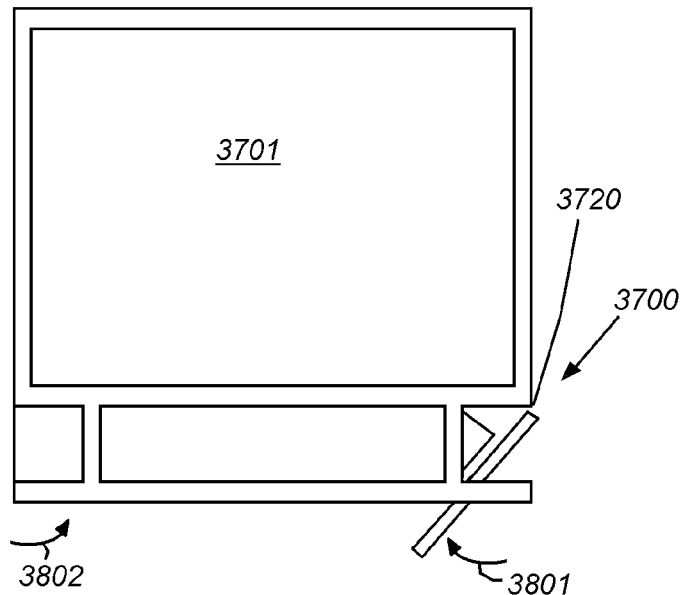
FIG. 38 is a perspective rear view of the rigid panel of FIG. 37 as it is folded inwardly toward the underside of the trailer, in accordance with the illustrative embodiment.
Figure 39:
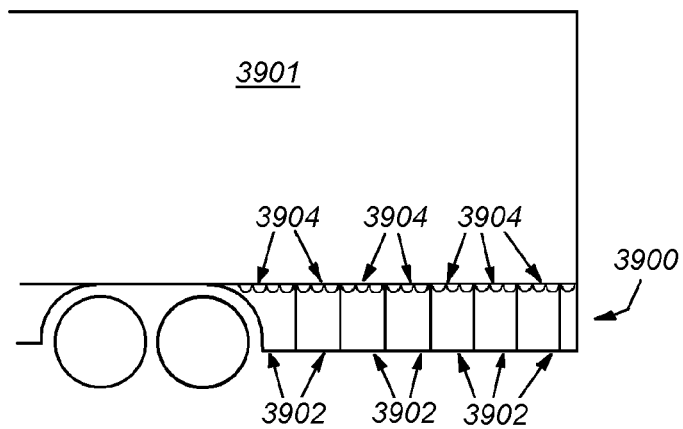
FIG. 39 is a perspective side view of a rigid panel assembly including a plurality of separate rigid panels that can be individually folded inward toward the underside of the trailer, to provide the desired length of the rigid panel assembly, in accordance with the illustrative embodiment.

Reference is now made to FIGS. 37-39 showing various illustrative embodiments of a rigid panel (or multiple sections of rigid panels) hingedly secured to the underside of a trailer. The rigid panels allow for manual or automatic (non-manual) folding inwards and upwards of the skirt panel, so that it lies parallel or just below the trailer floor when in the folded position, thereby allowing the rear wheels to be moved backward underneath the panel when so desired. FIG. 37 is a perspective side view of a rigid panel that is hingedly secured proximate an outer edge of the underside of the trailer, in accordance with an illustrative embodiment. The panel supporting brackets are also hinged and spring-loaded, such that they fold up on themselves when the panel is folded into a collapsed position. In an illustrative embodiment, the panel has a height of no more than approximately 25 to 30 inches, however the size is highly variable depending upon the truck construction and size. As shown in FIG. 37, a rigid panel assembly 3700 is secured to an underside of the trailer 3701 by an appropriate hinge 3720 at its attachment seam to the underside of the trailer. When a driver or other person needs to move the bogeys back, he or she can manually or automatically fold the panel inwards and up so that it sits parallel to, and just below, the trailer floor. This allows the rear bogeys to slide under the panel. With reference to FIG. 38, a user can stow the rigid panel 3700 by moving the panel in the direction of arrow 3801 and 3802 such that the bogey wheels can be moved as desired.

Referring now to FIG. 39, a perspective side view of a rigid panel assembly includes a plurality of separate rigid panels that can be individually folded inward toward the underside of the trailer, to provide the desired length of the rigid panel assembly, in accordance with the illustrative embodiment. The rigid panel assembly 3900 is secured to the trailer body 3900 and includes a plurality of rigid panels 3902 each having its own respective hinge 3904 for hingedly securing the panel to the trailer body 3901. Each panel 3902 is thus separately foldable so that the user can manually or automatically fold only one or a certain number of panels, depending on how far back it is desired that the rear wheels slide. This allows some panels to stay down/deployed in their fuel saving configuration.

While not shown, in further embodiments the aerodynamic skirt herein can be part of a continuous fairing that partially covers the wheels and/or that is also located ahead of the bogies.

The teachings herein should be readily applicable to those having ordinary skill to a variety of aerodynamic structure designs and geometries secured to the underbody of a cargo body, to thereby improve the aerodynamic efficiency of the cargo body. It should be further clear that the various aerodynamic structures provided according to the above embodiments effectively direct air with respect to the bottom of a trailer body or other vehicle cargo structure. This enhances the effectiveness of any rear aerodynamic structure employed on the vehicle, particularly where such structures contain only a top panel and side panels, and are generally free of a bottom panel.

The foregoing has been a detailed description of illustrative embodiments of the invention. Various modifications and additions can be made without departing from the spirit and scope of this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. For example, additional attachments and improvements can be made to the rear of the vehicle to further enhance the security and capabilities of the aerodynamic structure of this invention. Such enhancements can include extended bumper assemblies that project rearward beyond the folded aerodynamic assemblies, or special reflectors and/or lighting on the edges of the structure and/or spacer frame. Similarly, while not shown, any of the embodiments described herein can include flexible or rigid gaskets or other seal members that extend between the aerodynamic assembly and the trailer body to further streamline the junction therebetween. The panels can be constructed from a variety of durable materials or a combination of materials. For example, the panels can include rigid or semi-rigid frames covered in a flexible fabric or similar sheet material. In further embodiments, a series of fabric or flexible wells of a predetermined shape (for example a bowl or dish shape) can be defined within the central cavity of each aerodynamic structure when deployed. Such a well shape may enhance the aerodynamic effect. In addition, it is expressly contemplated that any of the mechanisms and features shown and described herein can be combined with other mechanisms and features as appropriate. Moreover, it is expressly contemplated that the skirt structures described herein can be employed in other types of vehicle bodies, such as dump bodies, tankers and auto carriers, with or without a corresponding rear-drag-reduction device. Additionally, all embodiments could alternatively be constructed as panels parallel with the trailer side or inwardly tapered. The panels could also have any number of complex curves to shape airflow inwards and upwards in this region. Finally, it should be clear that directional terms such as "up", "down", "left", "right", "top", "bottom", "front", "rear", "vertical", "horizontal", and the like are relative conventions and not necessarily absolute orientations with respect to a fixed coordinate system such as the operating direction of gravitational force. Accordingly, this description is meant to be taken only by way of example, and not to otherwise limit the scope of this invention.

What is claimed is:

1. An aerodynamic structure comprising:
   a first panel secured to an underbody of a cargo body and at least partially rearward of a wheel assembly, the first panel defining a first panel leading edge proximal to the wheel assembly and a first panel trailing edge distal to the wheel assembly such that the first panel leading edge is secured adjacent to a first side of the cargo body; and
   a second panel secured to the underbody of the cargo body and at least partially rearward of the wheel assembly, the second panel defining a second panel leading edge proximal to the wheel assembly and a second panel trailing edge distal to the wheel assembly such that the second panel leading edge is secured adjacent to a second side of the cargo body that is opposed to the first side of the cargo body,
     wherein the wheel assembly is positionable in at least one of a first position and a second position such that, a first distance between the first panel trailing edge and the second panel trailing edge in the first position is greater than a second distance between the first panel trailing edge and the second panel trailing edge in the second position, and
     wherein the first panel and the second panel each have a substantially fixed length.

2. The aerodynamic structure of claim 1, wherein the wheel assembly is a rearmost wheel assembly of the cargo body.

3. The aerodynamic structure of claim 1, wherein a third distance between the first panel leading edge and the second panel leading edge in the first position is equal to a fourth distance between the first panel leading edge and the second panel leading edge in the second position.

4. The aerodynamic structure of claim 1, further comprising:
   a first roller engaged with the first panel trailing edge that engages with a roller track; and
   a second roller engaged with the second panel trailing edge that engages with the roller track.

5. The aerodynamic structure of claim 1, wherein the first position is a forward wheel assembly position and the second position is the rearward wheel assembly position.

6. An aerodynamic structure comprising:
   a first panel secured to an underbody of a cargo body and at least partially rearward of a wheel assembly, the first panel defining a first panel leading edge proximal to the wheel assembly and a first panel trailing edge distal to the wheel assembly such that the first panel leading edge is secured adjacent to a first side of the cargo body;
   a second panel secured to the underbody of the cargo body and at least partially rearward of the wheel assembly, the second panel defining a second panel leading edge proximal to the wheel assembly and a second panel trailing edge distal to the wheel assembly such that the second panel leading edge is secured adjacent to a second side of the cargo body that is opposed to the first side of the cargo body;
     wherein the wheel assembly is positionable in at least one of a first position and a second position;
     wherein the first panel is rotatable such that a first angle, formed between a first vertical plane connecting the first panel leading edge and the first panel trailing edge and a second vertical plane coplanar with the first side of the cargo body, is greater when the wheel assembly is positioned in the first position instead of the second position.

7. The aerodynamic structure of claim 6, wherein the wheel assembly is a rearmost wheel assembly of the cargo body.

8. The aerodynamic structure of claim 6, wherein the second panel is rotatable such that a second angle, formed between a third vertical plane connecting the second panel leading edge and the second panel trailing edge and a fourth vertical plane coplanar to the second side of the cargo body, is greater when the wheel assembly is positioned in the first position than the second position.

9. The aerodynamic structure of claim 8, wherein the first angle is equal to the second angle when the wheel assembly is in the first position and the first angle is equal to the second angle when the wheel assembly is in the second position.

10. The aerodynamic structure of claim 6, further comprising:
    a first roller engaged with the first panel trailing edge that engages with a roller track; and
    a second roller engaged with the second panel trailing edge that engages with the roller track.

11. The aerodynamic structure of claim 6, wherein the first position is a forward wheel assembly position and the second position is the rearward wheel assembly position.

12. An aerodynamic structure comprising:
    a first panel secured to an underbody of a first side of a cargo body and at least partially rearward of a wheel assembly; and
    a second panel secured to the underbody of a second side of the cargo body and at least partially rearward of the wheel assembly, the second side being opposed to the first side;
      wherein the wheel assembly is positionable in at least one of a first position and a second position such that at least a portion of the first panel is coplanar or in a plane parallel with the first side in the first position and the at least the portion of the first panel forms a first angle with respect to the first side in the second position, and
      wherein the first panel has a substantially same length in the first position and the second position.

13. The aerodynamic structure of claim 12, wherein the wheel assembly is a rearmost wheel assembly of the cargo body.

14. The aerodynamic structure of claim 12, wherein at least a portion of the second panel is coplanar or in a plane parallel with the second side in the first position and the at least the portion of the second panel forms a second angle with respect to the second side in the second position.

15. The aerodynamic structure of claim 14, wherein the first angle and the second angle are greater than zero degrees.

16. The aerodynamic structure of claim 15, wherein the first angle and the second angle are equal.

17. The aerodynamic structure of claim 12, wherein the first position is a forward wheel assembly position and the second position is the rearward wheel assembly position.

18. An aerodynamic structure comprising:
a first panel secured to an underbody of a cargo body and at least partially rearward of a wheel assembly, the first panel defining a first panel leading edge proximal to the wheel assembly and a first panel trailing edge distal to the wheel assembly such that the first panel leading edge is secured adjacent to a first side of the cargo body;
a second panel secured to the underbody of the cargo body and at least partially rearward of the wheel assembly, the second panel defining a second panel leading edge proximal to the wheel assembly and a second panel trailing edge distal to the wheel assembly such that the second panel leading edge is secured adjacent to a second side of the cargo body that is opposed to the first side of the cargo body, and
wherein the wheel assembly is positionable in at least one of a forward position and a rearward position, and
wherein the first panel is rotatable such that a first angle, formed between a first vertical plane connecting the first panel leading edge and the first panel trailing edge and a second vertical plane coplanar with the first side of the cargo body, is different when the wheel assembly is positioned in the forward position instead of the rearward position.

19. The aerodynamic structure of claim 18, wherein the wheel assembly is a rearmost wheel assembly of the cargo body.

20. The aerodynamic structure of claim 18, wherein the second panel is rotatable such that a second angle, formed between a third vertical plane connecting the second panel leading edge and the second panel trailing edge and a fourth vertical plane coplanar to the second side of the cargo body, is different when the wheel assembly is positioned in the forward position than the rearward position.

21. The aerodynamic structure of claim 20, wherein the first angle is equal to the second angle when the wheel assembly is in its forward position and the first angle is equal to the second angle when the wheel assembly is in its rearward position.

22. The aerodynamic structure of claim 18, further comprising:
a first roller engaged with the first panel trailing edge that engages with a roller track; and
a second roller engaged with the second panel trailing edge that engages with the roller track.

* * * * *